(12) United States Patent
Chang

(10) Patent No.: US 11,381,876 B2
(45) Date of Patent: Jul. 5, 2022

(54) CONTROLLING INTERNET OF THINGS (IOT) DEVICES AND AGGREGATING MEDIA CONTENT THROUGH A COMMON DEVICE

(71) Applicant: Telegenic, Inc., Mapleton, UT (US)

(72) Inventor: Sun Chang, Bellevue, WA (US)

(73) Assignee: TELEGENIC, INC.

( * ) Notice: Subject to any disclaimer, the term of this patent is extended or adjusted under 35 U.S.C. 154(b) by 94 days.

(21) Appl. No.: 16/126,793

(22) Filed: Sep. 10, 2018

(65) Prior Publication Data

US 2019/0082230 A1  Mar. 14, 2019

Related U.S. Application Data

(60) Provisional application No. 62/556,347, filed on Sep. 9, 2017, provisional application No. 62/556,349, filed
(Continued)

(51) Int. Cl.
| | |
|---|---|
| *H04N 21/234* | (2011.01) |
| *H04N 21/431* | (2011.01) |
| *H04N 21/488* | (2011.01) |
| *H04N 21/462* | (2011.01) |
| *H04N 21/482* | (2011.01) |

(Continued)

(52) U.S. Cl.
CPC ..... *H04N 21/4622* (2013.01); *H04L 65/4069* (2013.01); *H04L 65/4084* (2013.01); *H04L 67/12* (2013.01); *H04N 21/42204* (2013.01); *H04N 21/433* (2013.01); *H04N 21/4312* (2013.01); *H04N 21/43615* (2013.01); *H04N 21/472* (2013.01); *H04N 21/482* (2013.01); *H04N 21/4825* (2013.01); *H04N 21/6112* (2013.01); *H04N 21/6125* (2013.01); *H04N 21/6587* (2013.01); *H04N 21/814* (2013.01); *G06F 3/0481* (2013.01); *G06F 3/0484* (2013.01); *G16Y 10/70* (2020.01); *H04N 21/4331* (2013.01); *H04N 21/458* (2013.01); *H04N 21/4532* (2013.01); *H04N 21/64322* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 2007/0083908 A1* | 4/2007 | McCarthy | H04N 21/6175 725/112 |
| 2009/0041100 A1* | 2/2009 | Kimmich | H04N 19/46 375/220 |

(Continued)

*Primary Examiner* — Brian T Pendleton
*Assistant Examiner* — Jean D Saint Cyr
(74) *Attorney, Agent, or Firm* — Jacob Ong; Ongs Law Firm, PLLC

(57) ABSTRACT

An apparatus for managing network enabled devices including a processor, a number of network interfaces, communicatively connected to the processor and a non-transitory storage medium. The modules may include a broadcast content obtain module, an other media obtain module, a content aggregate module, an aggregated content send module, a command receive module, and an instruction send module. The apparatus may request that an overlay be displayed on a device so that a user may instruct an instruction send module to interact with an Internet of Things device.

19 Claims, 13 Drawing Sheets

Related U.S. Application Data on Sep. 9, 2017, provisional application No. 62/556,351, filed on Sep. 9, 2017.

(51) Int. Cl.
| | |
|---|---|
| *H04N 21/81* | (2011.01) |
| *H04N 21/61* | (2011.01) |
| *H04L 65/612* | (2022.01) |
| *H04N 21/472* | (2011.01) |
| *H04N 21/436* | (2011.01) |
| *H04L 65/61* | (2022.01) |
| *H04N 21/433* | (2011.01) |
| *H04L 67/12* | (2022.01) |
| *H04N 21/422* | (2011.01) |
| *H04N 21/6587* | (2011.01) |
| *H04N 21/45* | (2011.01) |
| *H04N 21/458* | (2011.01) |
| *G16Y 10/70* | (2020.01) |
| *G06F 3/0481* | (2022.01) |
| *G06F 3/0484* | (2022.01) |
| *H04N 21/643* | (2011.01) |

(56) References Cited

U.S. PATENT DOCUMENTS

| | | | |
|---|---|---|---|
| 2016/0353177 A1* | 12/2016 | Gordon | H04N 21/4821 |
| 2017/0041669 A1* | 2/2017 | Duval | H04N 21/4821 |
| 2017/0118089 A1* | 4/2017 | Hur | H04L 12/2803 |
| 2018/0279012 A1* | 9/2018 | Carter | H04N 21/4722 |

* cited by examiner

CONTROLLING INTERNET OF THINGS (IOT) DEVICES AND AGGREGATING MEDIA CONTENT THROUGH A COMMON DEVICE

CROSS REFERENCE TO RELATED-APPLICATIONS

This application claims priority from U.S. patent application Ser. No. 62/556,347, filed on Sep. 9, 2017, which is incorporated in its entirety as if fully set forth herein. This application also claims priority from U.S. patent application Ser. No. 62/556,349, filed on Sep. 9, 2017, which is incorporated in its entirety as if fully set forth herein. This application also claims priority from U.S. patent application Ser. No. 62/556,351, filed on Sep. 9, 2017, which is incorporated in its entirety as if fully set forth herein.

TECHNICAL FIELD

The disclosure relates generally to network connected devices. Specifically, providing an interface to network connected devices in an Internet-of-Things combined with viewable media content.

BACKGROUND

Network connected devices allow devices to interact with each other for an improved user experience. For example, a television may receive content from various devices to be displayed for a user. An Internet-of-Things devices may be connected to a computer network in an Internet-of-Things that allows Internet-of-Things devices to interact.

The importance of cable television is waning. With the rise of newer options from Netflix, Amazon, Sling, Sony, Hulu, as well as channel-specific distributions such as HBO Go, the age of bundled and unwanted services may be approaching an end. Indeed, more cable subscribers are cutting out the middle man in order to subscribe to individualized packages of particular content and/or platforms. Unbundling of content services advantageously permits users to customize their content. However, unbundling also increases the difficulty of and poses technical challenges in accessing and presenting media content from different sources. For example, it may be difficult to seamlessly access and present over-the-air channels, music, video on demand, social media data, Internet Protocol Television (IPTV), and gaming.

BRIEF SUMMARY

An apparatus for managing network enabled devices is described and may include a processor, a number of network interfaces, communicatively connected to the processor and a non-transitory storage medium. The non-transitory storage medium may store a number of modules. Each module may cause the apparatus to perform a particular task. The modules may include a broadcast content obtain module, an other media obtain module, a content aggregate module, an aggregated content send module, a command receive module, and an instruction send module. The broadcast content obtain module may obtain broadcast television content. The other media obtain module may obtain other media content over the network communication. The content aggregate module may aggregate the broadcast television content and the other media content into aggregated content. The aggregated content send module may send the aggregated content over the network interface for presentation at a graphical user interface. The command receive module may receive a command through the network interface; the command may request performance of an operation at an Internet of Things (IoT) device. The instruction send module may send instructions through a network interface to the Internet of Things (IoT) device to perform the operation at the Internet of Things (IoT) device while aggregated content is being sent over the network interface.

A computer program product for managing network enabled devices is disclosed. The computer program product may include a broadcast content obtainer, an other media obtainer, a content aggregator, an aggregated content sender, a command receiver, and an instruction sender. The broadcast content obtainer may obtain broadcast television content. The other media obtainer may obtain other media content over a network communication. The content aggregator may aggregate the broadcast television content and the other media content into aggregated content. The aggregated content sender may send the aggregated content over a network interface for presentation at a graphical user interface. The command receiver may receive a command through a network interface; the command may request performance of an operation at an Internet of Things (IoT) device. The instruction sender may send instructions through a network interface to the Internet of Things (IoT) device to perform an operation at the Internet of Things (IoT) device while aggregated content is being sent over the network interface.

BRIEF DESCRIPTION OF THE DRAWINGS

To describe the manner in which the above-recited and other advantages and features may be obtained, a more particular description will be rendered by reference to specific implementations illustrated in the appended drawings. Understanding that these drawings depict only some implementations and are not therefore to be considered to be limiting of its scope, implementations will be described and explained with additional specificity and detail through the use of the accompanying drawings in which.

In this application, no additional figures are included.

DETAILED DESCRIPTION

Examples extend to apparatus, devices, methods, systems, and computer program products for controlling Internet of Things (IoT) devices and aggregating media content through a common device. The present invention generally relates to systems and methods for aggregating access to and delivery of media content over a network. More specifically, access to and delivery of media content from a plurality of different content sources, such as, for example, over-the-air Television (TV), over-the-top content, and on demand content may be aggregated over a graphical user interface (GUI). Internet of Things (IoT) devices may be controlled through the same device that aggregates media content.

Accordingly, aspects of the invention may be used to effectively aggregate access to and delivery of (e.g., customizable) media content for a user, across many end user devices.

In this description and the following claims, an "aggregator" is defined as hardware and/or software that interoperates to aggregate access to and delivery of media content via a display device. In some aspects, an aggregator is a general purpose computer, such as, for example, a Personal Computer (PC), tablet, mobile device or phone, or a specialized computer, such as, for example, a set top box, TV stick, or other thin client utilizing various operating system(s) and software for aggregating access to and delivery of media content to a user locally via a display device. In other aspects, an aggregator is an application server including services for aggregating access to and delivery of media content to a user over a network (e.g., the Internet). An aggregator may be used to render a seamless GUI that aggregates access to a plurality of different content sources.

A module, is a portion of a non-transitory storage medium storing a specific set of instructions, wherein the portion of the non-transitory storage medium is communicatively-coupled to a processor. An obtainer may be a module for obtaining something.

Local Aggregation

Figure 1:
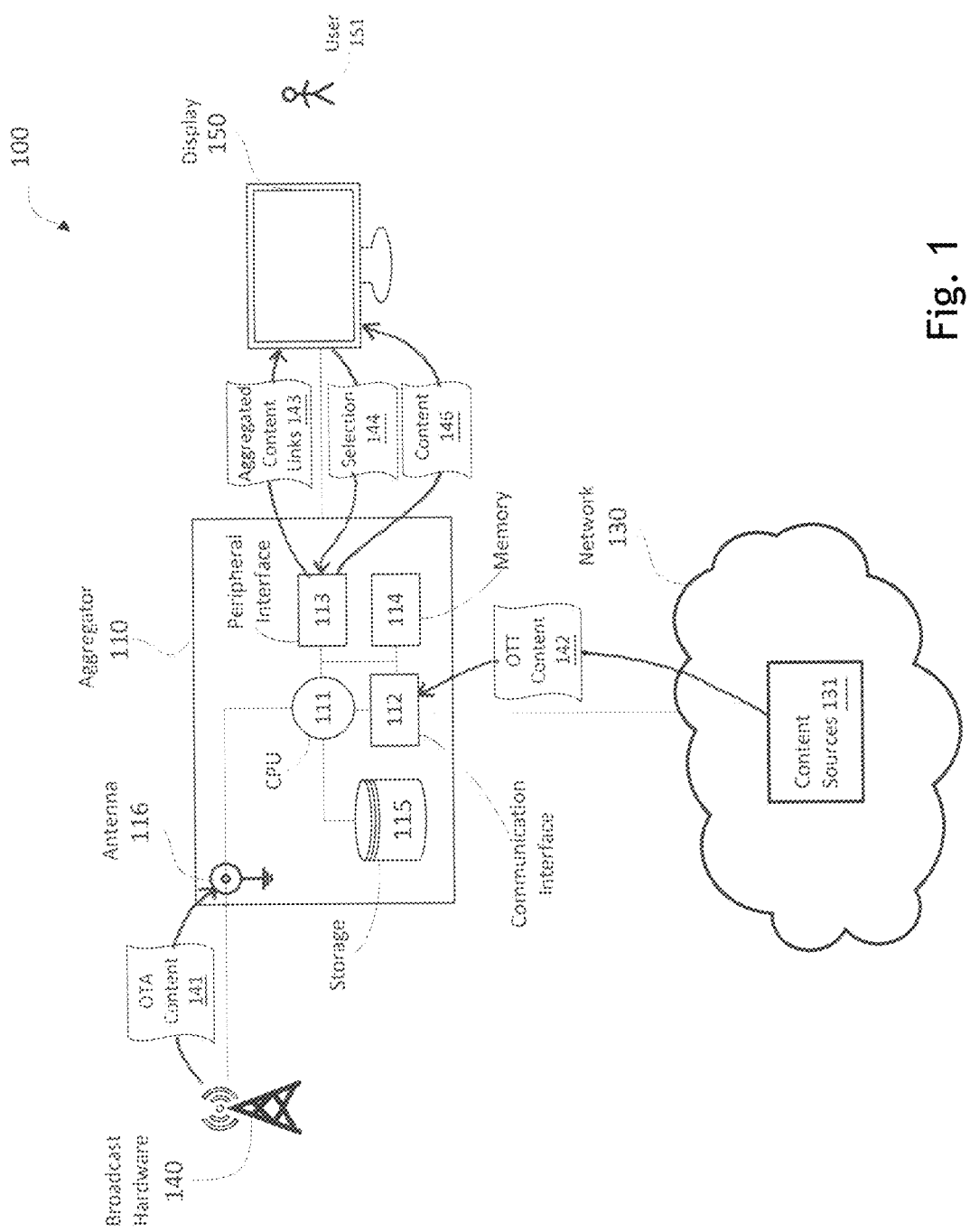
FIG. 1 illustrates an example architecture that facilitates providing aggregated access to and delivery of media content locally.

FIG. 1 illustrates an example architecture 100 for providing aggregated access to and delivery of media content locally. As depicted, computer architecture 100 may include aggregator 110, network 130, over-the-air broadcast hardware 140, and display 150. Aggregator 110 may be deployed locally as a local media player and media content aggregator. Aggregator 110 may aggregate access to and delivery of media content from multiple sources.

As depicted, aggregator 110 may include CPU 111, communication interface 112, peripheral interface 113, memory 114, and antenna 116.

Over-the-air broadcast hardware may broadcast over-the-air (OTA) content 141. Antenna 116 may receive OTA content 141. Alternately, antenna 116 may be external to aggregator 110. Antenna 116 may receive OTA content 141 and OTA content 141 may be transferred to aggregator 110 via coaxial cable. Antenna 116 may be compatible for receiving one or more of: NTSC, ATSC, DVB-T and DVB signals.

Network 130 may be a local area network (LAN), wide area network (WAN) or even the Internet. Network 130 may include content sources 131. Content sources 131 may send (e.g., stream) over-the-top (OTT) content 142 to aggregator 110. Communication interface 112 may receive OTT content 142 from content sources 131.

OTA content 141 or portions thereof and/or OTT content 142 or portions thereof may be transmitted through peripheral interface 113 to display 150. Peripheral interface 113 may include an HDMI, DVI, VGI, DisplayPort, component, composite, S-Video, CoaXPress, HDBaseT, DiiVA, MHL, or other equivalent cable, WiFi, NFC, or other communication mechanisms known to those skilled in the art.

Additional connectors of aggregator 110 may comprise USB, RCA, RJ45, COAX, and interfaces for various input devices including but not limited to remotes and keyboards. User 151 may use the input devices to send input to aggregator 110.

Communication interface 112 may include an LTE chip or other equivalent cellular chip (e.g., WiMax, CDMA, EDGE, 5G, GPRS, GSM, etc.) for wireless communications and broadband access. Communication interface 112 may also include a Wi-Fi interface, a Bluetooth interface, or wired (e.g., Ethernet) interface.

Aggregator 110 may also include components for amplifying and/or control signals, including signals received via antenna 116.

Aggregator 110 may include an operating system, such as, for example, Android, iOS, Windows, Linux, etc. Aggregator 110 may include telephony components and input/output for providing voice over IP services. Aggregator 110 may be a digital video recorder (DVR) or personal video recorder (PVR) for recording various media content (e.g., stored in storage 115). The recorder may be structured and configured to capture a plurality of streams or content simultaneously.

In one aspect, aggregator 110 may support a plurality of antennas for separately receiving authorized content to separate residents living in close proximity.

Aggregator 110 may formulate links for accessing different content (e.g., different channels) in OTA content 141. Aggregator 110 may also formulate links for accessing content from different content sources (e.g., different applications, network locations, etc.) in OTT content 142. Aggregator 110 may aggregate the formulated links in aggregated content links 143. For example, aggregated links 143 may include links for one or more channels of OTA content 141 and links for one or more of content sources 131 (e.g., one or more applications, one or more network locations, etc.). Aggregator 110 may present aggregated content links 143 at display 150 through peripheral interface 113 (e.g., in a content (channel) guide).

User 151 may make selection 144 (of one or more of aggregated content links 143). Selection 144 may be sent to aggregator 110 through peripheral interface 113. Aggregator 110 may identify content 146 corresponding to any selected link. Aggregator 110 may send content 146 to display 150 through peripheral interface 113.

In one aspect, selection 144 may select multiple links from aggregated content links 143. Aggregator 110 may identify a content source corresponding to each selected link. Aggregator 110 may aggregate the content from the identified content sources into content 146. For example, aggregator 110 may aggregate content from a channel of OTA content 141 and from an application of OTT content 142. Aggregator 110 may send aggregated content 146 to display 150 through peripheral interface 113.

Network Aggregation

Figure 2:
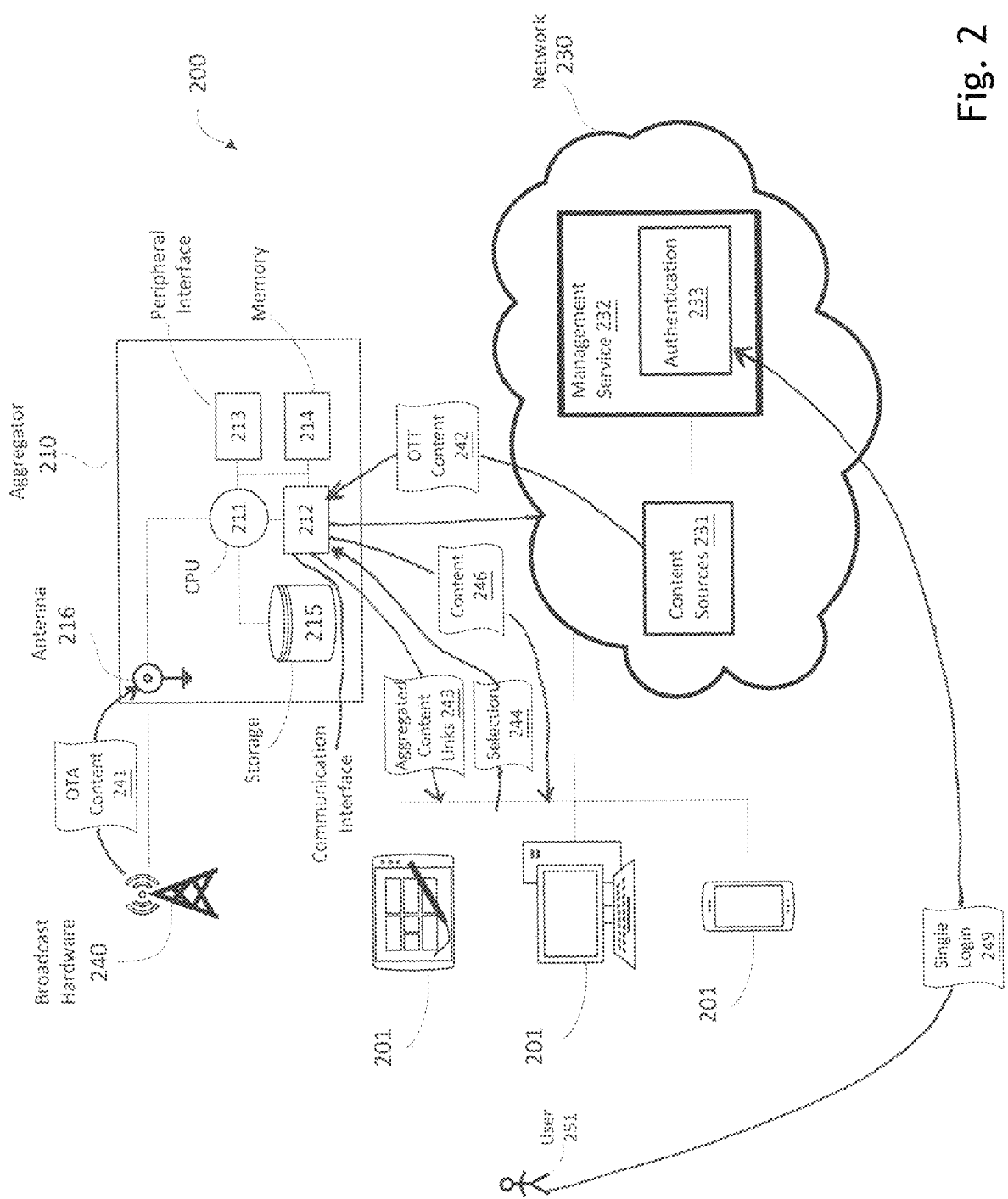
FIG. 2 illustrates an example architecture that facilitates providing aggregated access to and delivery of media content over a network.

FIG. 2 illustrates an example architecture 200 for providing aggregated access to and delivery of media content locally. As depicted, computer architecture 200 may include devices 201, aggregator 210, network 230, and over-the-air broadcast hardware 240. Aggregator 210 may aggregate access to and delivery of media content from multiple sources across multiple devices for multiple users.

As depicted, aggregator 210 includes CPU 211, communication interface 212, peripheral interface 213, memory 214, and antenna 216. In one aspect, aggregator 210 may be included in a router that also provides wireless network connectivity to other devices.

Devices 201 may include a mobile device, a tablet, a computer, a wearable electronic device, or any other device or combination of circuits structured and configured to communicate with another device, computer, aggregator 210, etc. via Bluetooth or Wi-Fi connection.

Devices 201 may comprise application(s) and user interface(s) (front-end interface) that may allow a user to interact with aggregator 201, content sources 231, and management service 232, as well as other servers, services and stored applications and programs thereon (back-end processing). The user interface may be proprietary and may comprise a custom developed mobile or desktop application(s). Alternatively, or in addition to, the user interface may comprise a web browser, mobile browser, or other application or executable code that allows for communication and visualization of information.

Over-the-air broadcast hardware may broadcast over-the-air (OTA) content 241. Antenna 216 may receive OTA content 241. Alternately, antenna 216 may be external to aggregator 210. Antenna 216 may receive OTA content 241 and OTA content 241 may be transferred to aggregator 210 via coaxial cable. Antenna 216 may be compatible for receiving one or more of: NTSC, ATSC, DVB-T and DVB signals.

Network 230 may be a local area network (LAN), wide area network (WAN) or even the Internet. Network 230 may include content sources 231 and management service 232.

Management service 232 may manage users that utilize content aggregation. For example, management service 232 may keep credentials for users that use subscription content sources. Management service 232 may login to subscription content sources on behalf of a user so that content from the subscription content sources may be aggregated with other (e.g., OTA) content. As depicted, management service 232 may include authentication 233.

A user may perform a single login to manage service 232 using authentication 233. Once logged in, management service may then access subscription content on behalf of the logged in user. For example, user 251 may perform a single login 249 with authentication 233. Accessed content sources may include content sources in content sources 231 for which user 251 has a subscription. A single login may include entering a PIN, biometric data (e.g., voice recognition, etc.), or a password. In one aspect, a single login may use multiple types of data, such as, for example, multiple forms of biometric data, a form of biometric data and a PIN, etc.

After user 251 is logged into management service 232, management service 232 may then access content (e.g., subscription) sources on behalf of user 251. For example, content sources 231 may send (e.g., stream) over-the-top (OTT) content 242 to aggregator 210 for user 251. Communication interface 212 may receive OTT content 242 from content sources 231. Communication interface 212 may include an LTE chip or other equivalent cellular chip (e.g., WiMax, CDMA, EDGE, 5G, GPRS, GSM, etc.) for wireless communications and broadband access. Communication interface 212 may also include a Wi-Fi interface, a Bluetooth interface, or wired (e.g., Ethernet) interface. OTA content 241, or portions thereof, and/or OTT content 242, or portions thereof, may be transmitted through communication interface 212 to a device 201.

Aggregator 210 may also include components for amplifying and/or control signals, including signals received via antenna 216.

Aggregator 210 may include an operating system, such as, for example, Android, iOS, Windows, Linux, etc. Aggregator 210 may include telephony components and input/output for providing voice over IP services. Aggregator 210 may include a digital video recorder (DVR) or personal video recorder (PVR) to record various media content (e.g., stored in storage 215). The recorder may be structured and configured to capture a plurality of streams or content simultaneously.

In one aspect, aggregator 210 may support a plurality of antennas for separately receiving authorized content to separate residents living in close proximity.

Aggregator 210 may formulate links for accessing different content (e.g., different channels) in OTA content 241. Aggregator 210 may also formulate links for accessing content from different content sources (e.g., different applications, application servers, network locations, subscription services, etc.) in OTT content 242. Aggregator 210 may aggregate the formulated links in aggregated content links 243. For example, aggregated links 243 may include links for one or more channels of OTA content 241 and links for one or more of content sources 231 (e.g., one or more applications, one or more application servers, one or more network locations, subscription services, etc.). Aggregator 210 may send aggregate content links through communication interface 212 over network 230 to a device 201.

The device 201 may present aggregated content links 243 at a display (e.g., in a content (channel) guide). User 251 may make selection 244 (of one or more of aggregated content links 143) at the device 201. The device 201 may send selection 244 over network 230 through communication interface 212 to aggregator 210. Aggregator 210 may identify content 246 corresponding to any selected link. Aggregator 210 may send content 146 through communication interface 212 over network 230 to the device 201.

In one aspect, selection 244 may include a selection of multiple links from aggregated content links 243. Aggregator 210 may identify a content source corresponding to each selected link. Aggregator 210 may aggregate the content from the identified content sources into content 246. For example, aggregator 210 may aggregate content from a channel of OTA content 241 and from an application of OTT content 242. Aggregator 210 may send aggregated content 246 through communication interface 212 over network 230 to the device 201.

Accordingly, aspects of the invention include aggregating access to and presentation of media content based on a single authentication, wherein the media content includes over-the-air content and Internet content.

In this description and the following claims an "application server" or "third party server" may be defined as at least one computer having appropriate hardware and applications installed thereon for the provision of server services including web and other functional services described herein, such that a user may access, execute, and/or view the applications remotely from a device 201. More specifically, application servers or third party servers may comprise general purpose computers, specialized computers, or other hardware components structured and configured to receive, process, transmit, and store information to and from other devices.

Application servers or third party servers may be further configured with executable or interpretable computer code that facilitates performance the processes described within this application.

For example, in one aspect, aggregator 210 may be an application or third party server comprising a central processing unit (CPU) 211, which may be a single core or multi core processor, memory 214 (random-access memory, read-only memory, and/or flash memory) or primary memory for high-speed storage of executing programs electronic storage unit 215 (e.g., hard disk) or secondary memory for storing data, communications interface 212 (e.g., a network adapter) for communicating with other devices or computers over a network, and/or peripheral device interface 113 in communication with the CPU 111 that enable input/output from aggregator 210.

Aggregator 210 may implement the aspects of the invention using any number of solution stacks (i.e., a set of software subsystems or components) known to an ordinary computer or web programmer skilled in the art. These solution stacks may include, without limitation, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, XRX, and other past, present, or future equivalent solution stacks, or combinations thereof known to those skilled in the art that allows a programmer to develop the methods and computer programs described within this application.

The software stack may be implemented with third-party cloud platforms, for example using load balancing and virtualization software provided by Citrix, Microsoft, VMware, Map-Reduce, Google Filesystem, Xen, memory caching software such as Memcached and Membase, structured storage software such as MySQL, MariaDB, XtraDB, etc. and/or other appropriate platforms, various packaged web services such as those provided by Amazon Web Services (AWS). Of course, these solution stacks may also be deployed in cloud platforms by using known development tools and server hosting services such as GitHub and Rackspace, as well as their equivalents.

Network 230 (or 130) may comprise at least two computers in communication with each other, which may form a data network such as via LAN, WAN, Serial, Z-WAVE, ZIGBEE, RS-485, MODBUS, BACNET, the Internet, or combinations thereof. The connections may be facilitated over various wired and/or wireless mediums or any combination thereof including interconnections by routers and/or gateways. Network 230 (or 130) may comprise additional hardware components and/or devices appropriate for facilitating the transmission and communication between the various systems and devices of the present invention, such as those directed to integrated authentication, quality control or to improve content delivery such as via a content delivery network (CDN).

In one aspect, aggregator 210 may be deployed on one or more computers as an installable software.

Various aspects of the present invention may be thought of as "products" or "articles of manufacture" typically in the form of machine (or processor) executable code, interpretable code, and/or associated data that is carried on or embodied in a machine readable medium. Machine-executable code may be stored on an electronic storage unit, such memory (e.g., read-only memory, random-access memory, flash memory) or a hard disk, as described above.

All or portions of the software may at times be communicated through the Internet or other communication networks. Such communications, for example, may enable loading of the software from one computer or processor onto another, for example, from a management server or host computer onto the computer platform of an application server, or from an application server onto a client computer or device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, tangible "storage" media, terms such as computer or machine "readable medium", refer to any medium that participates in providing instructions to a processor for execution. Further, the term "non-transitory" computer readable media includes both volatile and non-volatile media, including RAM. In other words, non-transitory computer media excludes transitory propagating signals per se, but includes at least register memory, processor cache, RAM, and equivalents thereof.

Therefore, a machine readable medium, such as computer executable code, may take many forms, including but not limited to, a tangible storage medium, a carrier wave medium or physical transmission medium. Non-volatile storage media include, for example, optical, magnetic, or solid state disks, such as any of the storage devices in any computer(s) or the like, such as may be used to house the databases. Volatile storage media include dynamic memory, such as main memory of such a computer platform. Tangible transmission media may include coaxial cables, copper wire and fiber optics, communication buses. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Aggregation Methods

Figure 3:
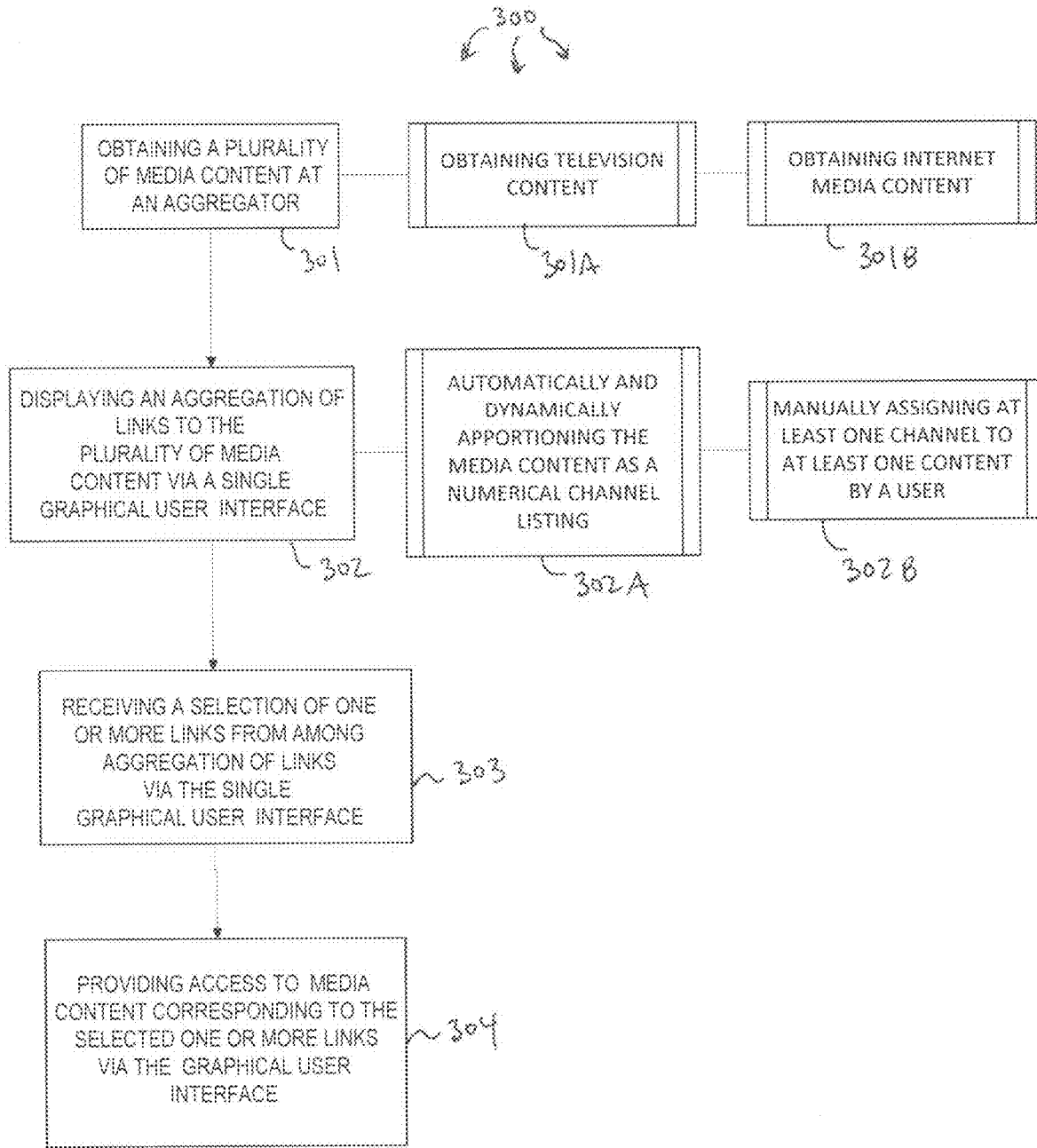
FIG. 3 illustrates a flow chart of an example method for aggregating access to and delivery of media content

FIG. 3 illustrates a flow chart of an example method 300 for aggregating access to and delivery of media content. Method 300 will be described with respect to the components and data in computer architectures 100 and 200.

Method 300 includes obtaining a plurality of media content at an aggregator (301). For example, aggregator 110 may obtain OTA content 141 and OTT content 142. Similarly, aggregator 210 may obtain OTA content 241 and OTT content 242. A plurality of content may include television content, Internet media content comprising live streams and/or pre-recorded content, gaming content, music content, media-on-demand content, other media content whether over-the-air signals, or by Internet or local networks, and/or combinations thereof. For example, television content may be obtained via a coaxial in to the aggregator deployed as a set top box or router, and Internet content may be spidered or crawled from the web, or may be updated or directed from a central application server service in communication with the aggregator.

Thus, method 300 may include obtaining television content (301A) and obtaining Internet media content (301B).

In one aspect, language consolidation and/or interpretation may be deployed as part of the aggregator.

In another aspect, a particular content may be associated with multiple locations, i.e. such as a major network having an affiliate in each major city. As such, the feeds for all cities or affiliates may be obtained at the aggregator by various communication mediums, and a user may select geographically which feed to display. In other embodiments, geolocation capability of a user's device may be detected automatically by the aggregator in order to display an appropriate and/or authorized stream to the user device.

Method 300 may include displaying an aggregation of links to the plurality of media content via a single graphical user interface (302). For example, aggregator 110 may display aggregated content links 143 on a GUI at display 150. Similarly, aggregator 210 may display aggregated content links 243 on a GUI at a device 201.

Figure 4:
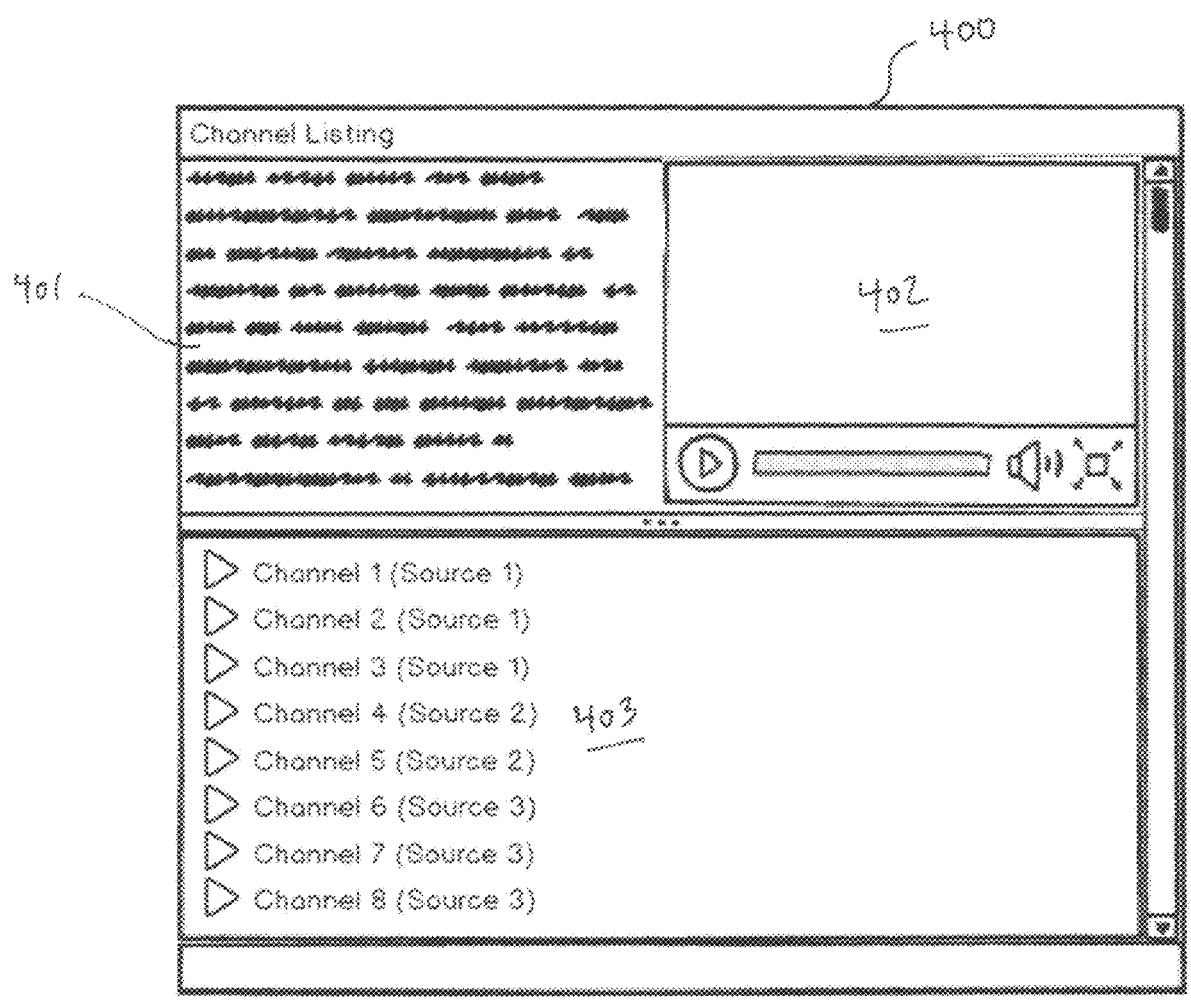
FIG. 4 illustrates an example wireframe of a graphical user interface for aggregating access to media content from a plurality of different sources.

FIG. 4 depicts an example graphical user interface in the form of hybrid channel guide 400. Hybrid channel guide 400 may include a media description portion 401, a media or video preview portion 402, and a channel or program listing 403 across a plurality of content sources. Hybrid channel guide 400 may include a numerical channel listing which may be segregated into channel blocks, may be sequential, and/or may be custom set by a user. Aggregated content links 143 and/or aggregated content links 243 may be arranged within a hybrid channel guide similar to hybrid channel guide 400.

In one aspect, method 300 may include automatically and dynamically apportioning the media content as a numerical channel listing (302A). For example, aggregator 110 may automatically and dynamically apportion OTA content 141 and OTT content 142 as a numerical channel listing in aggregated content links 143. Similarly, aggregator 210 may automatically and dynamically apportion OTA content 241 and OTT content 242 as a numerical channel listing in aggregated content links 243. A numerical channel listing may be automatically and dynamically apportioned by an aggregator as additional content becomes available and/or unavailable.

In another aspect, method 300 includes manually assigning at least one channel to at least one content by a user (302B). For example, user 151 may assign a channel in aggregated content links 143 for a portion of content in OTA content 141 or OTT content 142. Similarly, user 251 may assign a channel in aggregated content links 243 for a portion of content in OTA content 241 or OTT content 242.

In further aspects, different media content may be sorted categorically.

Method 300 may include receiving a selection of one or more links via the single graphical user interface (303). For example, aggregator 110 may receive selection 144 from user 151. Similarly, aggregator 210 may receive selected 244 from user 251.

Method 300 includes providing access to media content corresponding to the selected one or more links via the graphical user interface (304). For example, aggregator 110 may provide user 151 with access to (potentially aggregated) content 146. Similarly, aggregator 210 may provide user 251 with access to (potentially aggregated) content 246.

In one aspect, the plurality of media content may be accessible via the aggregator over the Internet, via the same or a separate graphical user interface. Accordingly, the aggregator in this embodiment may comprise server services as described and/or additional video or music streaming services accessible by a separate device in communication with the aggregator over the Internet or a local network.

Figure 5:
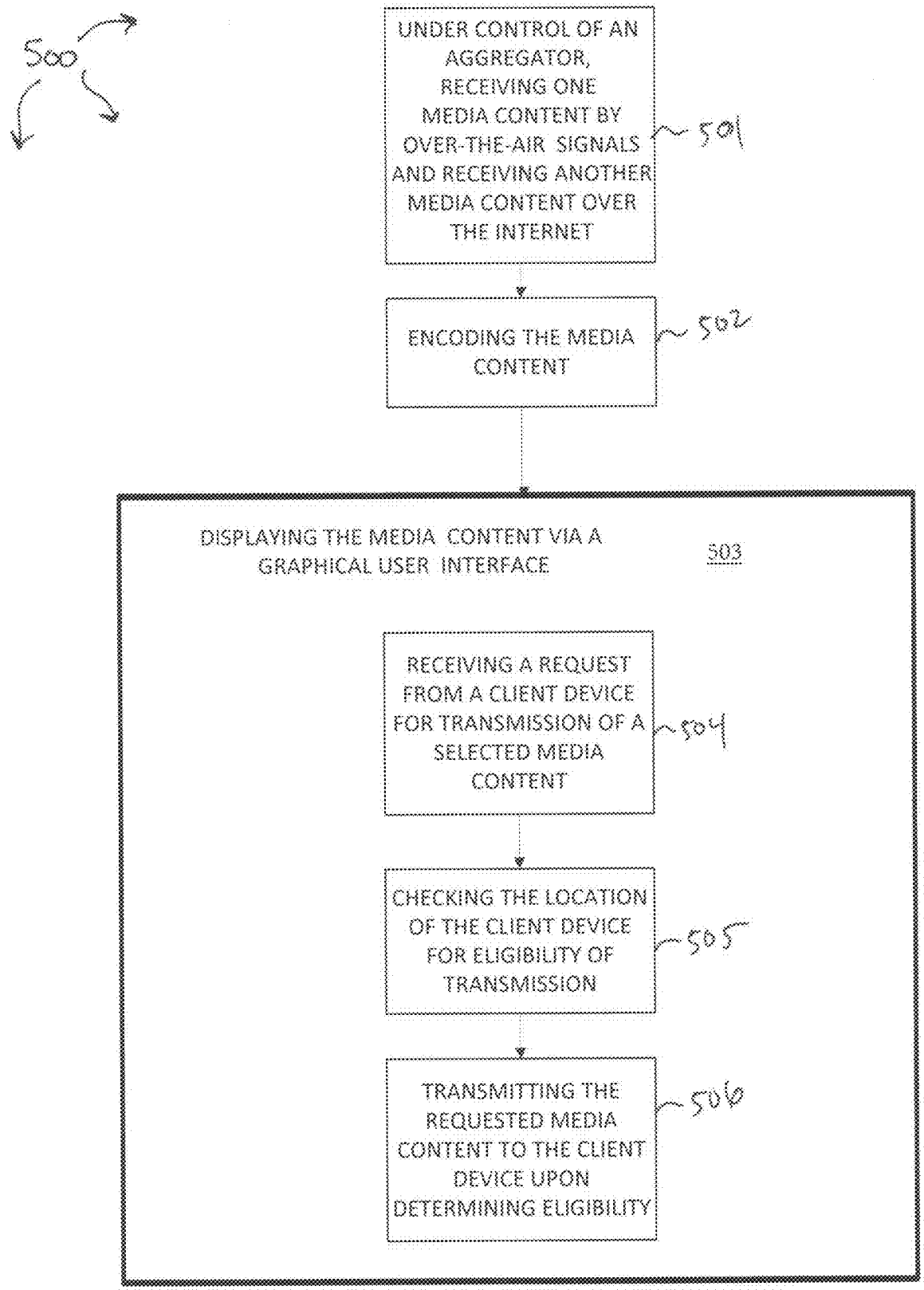
FIG. 5 illustrates a flow chart of another example method for aggregating access to and delivery of media content.

FIG. 5 illustrates a flow chart of an example method 500 for aggregating access to and delivery of media content. Method 500 may be implemented to aggregate media content from different content sources and provide the aggregated content over a network.

Method 500 may include, under the control of an aggregator, receiving one media content by over-the-air signals and receiving another media content over the Internet (501). For example, aggregator 210 may receive OTA content 241 and OTT content 242. Method 500 may include aggregating and encoding the media content (502). For example, aggregator 210 may aggregate OTA content 241 and OTT content 242 together into content 146 and encode content 146. Aggregator 210 may encode content 246 such that it is decodable via a corresponding software and/or end user or client device.

Method 500 includes displaying media content via graphical user interface (503). For example, aggregator 210 may display aggregated content 246 at the device 201.

Displaying media content via graphical user interface may include receiving a request to display the media content over the internet via a graphical user interface (504). For example, aggregator 210 may receive selection 244 from a device 201. Selection 244 may be a selection of links requesting display of aggregated content 246 at the device 201. Displaying media content via graphical user interface may include checking the location of the client device for eligibility of transmission (505). For example, aggregator 210 may check the location of the device 201 for eligibility of transmission of aggregated content 246. Displaying media content via graphical user interface may include transmitting the requested media content to the client device upon determining eligibility (506). For example, aggregator 210 may transmit aggregated content 246 to the device 201 upon determining eligibility of the device 201.

Other aspects of the present invention may relate to methods of providing an inclusive hardware and software solution as a service as an alternative to cable television. Accordingly, in one aspect, an application server or router may include an aggregator for aggregating a plurality of media content as described above from the Internet and from various over-the-air signals across the globe (including UHF/VHF, ATSC, DVB, and other equivalent reception). Software at the application server or router may provide for metadata extraction tools, such as live linking methods to ensure Internet link validity.

In one aspect, a video game platform may be provided, for download, demoing, renting and/or purchasing various video games and/or apps.

Controlling Internet of Things (IoT) devices

Figure 6:
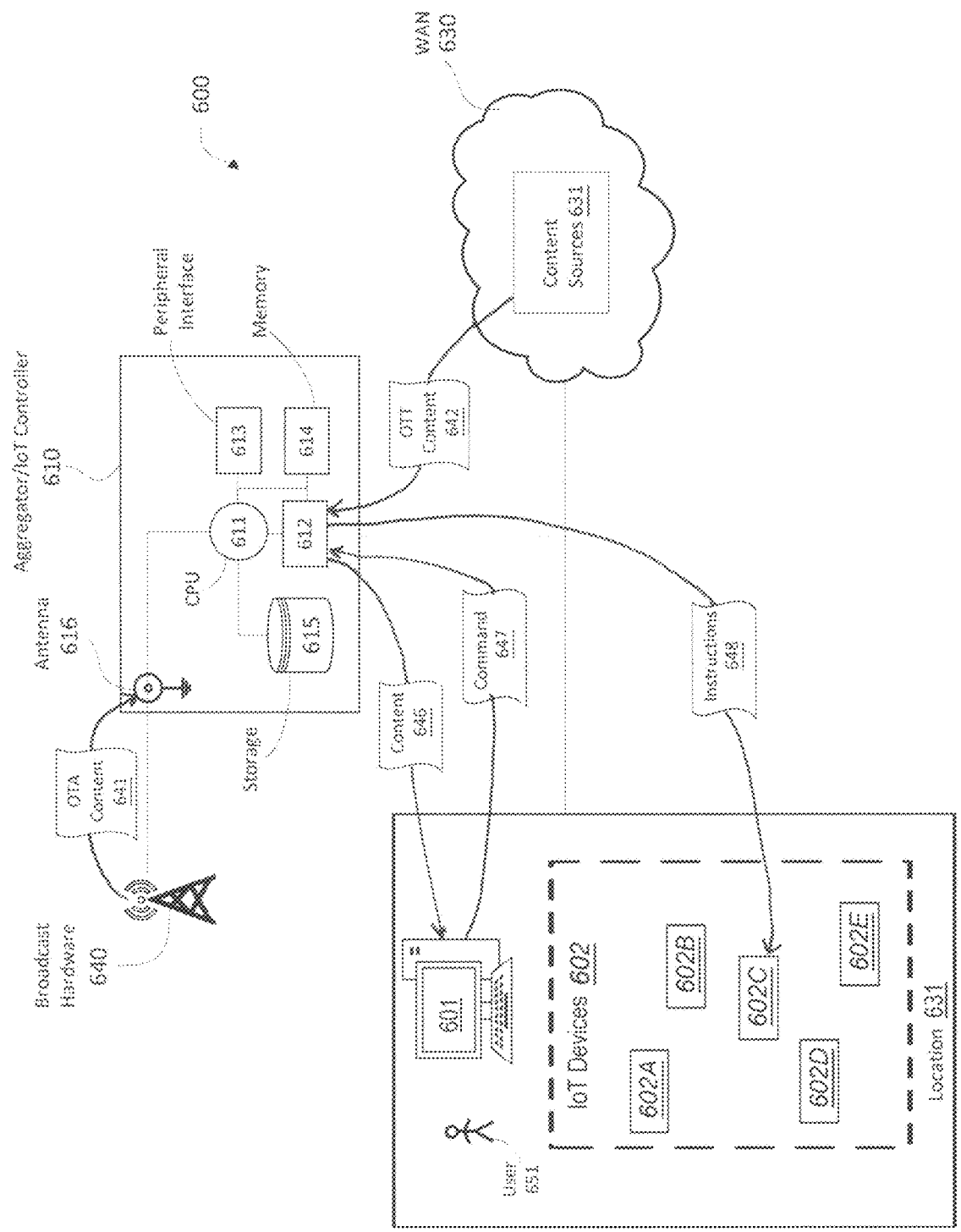
FIG. 6 illustrates an example architecture that facilitates controlling Internet of Things (IoT) devices and aggregating media content through a common device.

FIG. 6 may illustrate an example architecture 600 that facilitates controlling Internet of Things (IoT) devices and aggregating media content through a common device. As depicted, computer architecture 600 may include device 601, Internet of Things (IoT) devices 602, aggregator/Internet of Things (IoT) controller, 610, Wide Area Network (WAN) 630, and over-the-air broadcast hardware 640. Aggregator/IoT controller 610 may aggregate access to and delivery of media content from multiple sources across multiple devices for multiple users. Aggregator/IoT controller 610 may also monitor and/or send commands to Internet of Things (IoT) devices to control the Internet of Things (IoT) devices.

As depicted, Aggregator/IoT controller 610 may include CPU 611, communication interface 612, peripheral interface 613, memory 614, and antenna 616. In one aspect, aggregator/IoT controller 610 may be included in a router that also provides wireless network connectivity to other devices.

Device 601 may be a mobile device, a tablet, a computer, a wearable electronic device, or any other device or combination of circuits structured and configured to communicate with another device, computer, aggregator/IoT controller 610, etc. via Bluetooth or Wi-Fi connection.

Device 601 may comprise application(s) and user interface(s) (front-end interface) that allows a user to interact with aggregator/IoT controller 610, content and sources 631, as well as other servers, services and stored applications and programs thereon (back-end processing). The user interface may be proprietary and may comprise a custom developed mobile or desktop application(s). Alternatively, or in addition to, the user interface may comprise a web browser, mobile browser, or other application or executable code that allows for communication and visualization of information.

IoT devices 602 may include IoT devices 602A-602E. IoT devices 602A-602E may be any of a variety of IoT devices, such as, for example, cameras, thermostats, light bulbs, power outlets, door locks, trackers, kitchen appliances, bike locks, scales, alarm sensors, televisions, other A/V equipment, doorbells, etc.

Over-the-air broadcast hardware 640 may broadcast over-the-air (OTA) content 641. Antenna 616 may receive OTA content 641. Alternately, antenna 616 may be external to aggregator 610. Antenna 616 may receive OTA content 641 and OTA content 641 may be transferred to aggregator 610 via coaxial cable. Antenna 616 may be compatible for receiving one or more of: NTSC, ATSC, DVB-T and DVB signals.

Network 630 may be a local area network (LAN), wide area network (WAN) or even the Internet. Network 630 includes content sources 631.

Communication interface 612 may receive OTT content 642 from content sources 631. Communication interface 612 may include an LTE chip or other equivalent cellular chip (e.g., WiMax, CDMA, EDGE, 5G, GPRS, GSM, etc.) for wireless communications and broadband access. Communication interface 612 may also include a Wi-Fi interface, a Bluetooth interface, or wired (e.g., Ethernet) interface. OTA content 641 or portions thereof and/or OTT content 642 or portions thereof may be transmitted through communication interface 612 to device 601.

Aggregator/IoT controller 610 may also include components for amplifying and/or control signals, including signals received via antenna 616.

Aggregator/IoT controller 610 may include an operating system, such as, for example, Android, iOS, Windows, Linux, etc. Aggregator/IoT controller 610 may include telephony components and input/output for providing voice over IP services. Aggregator/IoT controller 610 may include a digital video recorder (DVR) or personal video recorder (PVR) to record various media content (e.g., stored in storage 615). The recorder may be structured and configured to capture a plurality of streams or content simultaneously.

In one aspect, aggregator/IoT controller 610 may support a plurality of antennas for separately receiving authorized content to separate residents living in close proximity.

In one aspect, aggregator/IoT controller 610 may aggregate content from multiple content sources into content 646. For example, aggregator 610 may aggregate content from a channel of OTA content 641 and from an application of OTT content 642. Aggregator/IoT controller 610 may send aggregated content 646 through communication interface 612 over network 630 to device 601.

Aggregator/IoT controller 610 may receive commands from devices and send corresponding instructions to IoT devices 602A-602E to control any of IoT devices 602A-602E.

Figure 7:
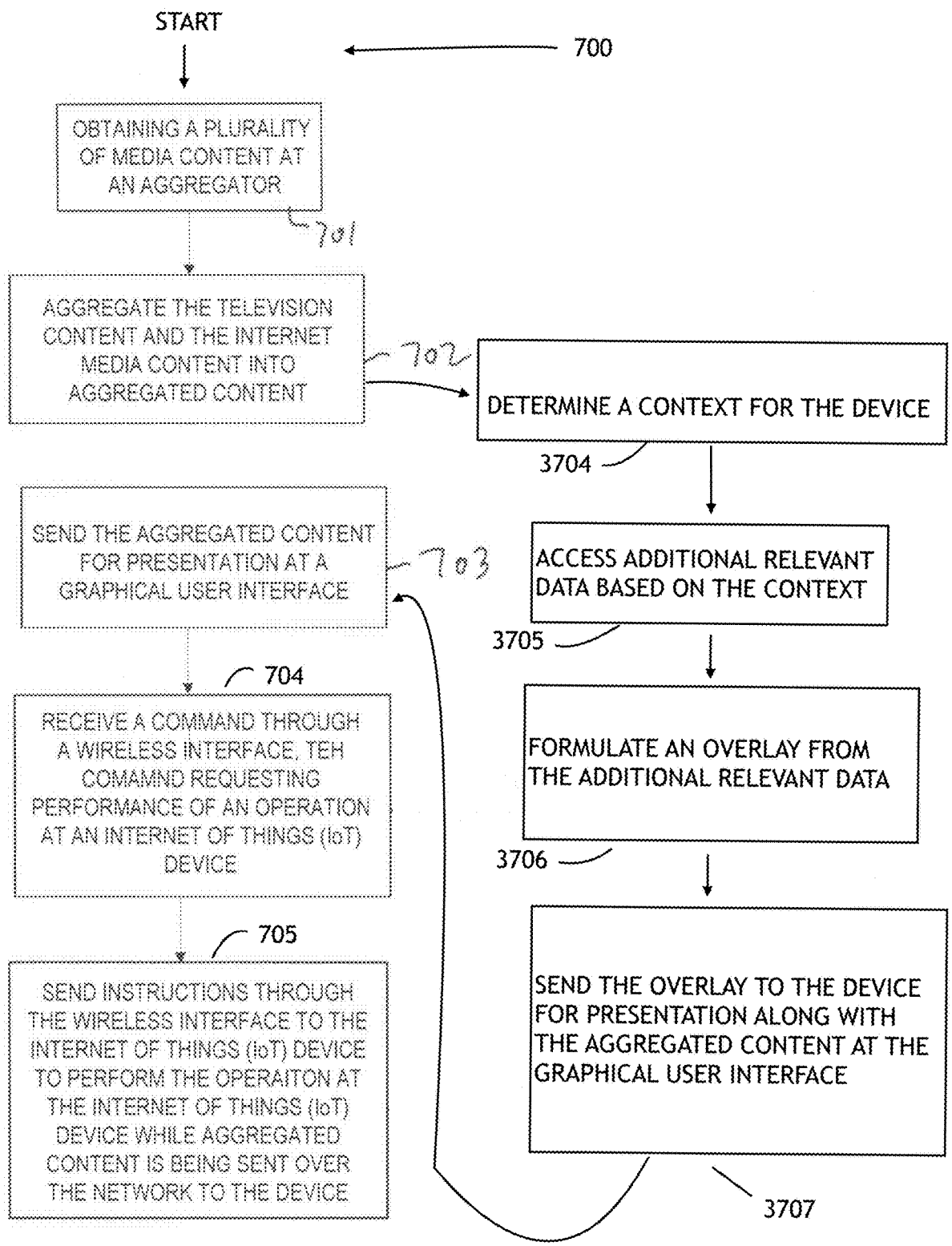
FIG. 7 illustrates a flow chart of an example method for controlling Internet of Things (IoT) devices, aggregating media content through a common device, and displaying an overlay.

FIG. 7 illustrates a flow chart of an example method 700 for overlaying other relevant data on aggregated media content at a graphical user interface and controlling Internet of Things (IoT) devices. Method 700 will be described with respect to the components and data in computer architecture 600.

Method 700 may include obtaining a plurality of media content at an aggregator (701). For example, aggregator/IoT controller 610 may obtain OTA content 641 and OTT content 642. A plurality of content may include television content, Internet media content comprising live streams and/or pre-recorded content, gaming content, music content, media-on-demand content, other media content whether over-the-air signals, or by Internet or local networks, and/or combinations thereof. For example, television content may be obtained via a coaxial cable connecting into the aggregator that may be deployed as a set top box or router, and Internet content may be spidered or crawled from the web, or may be updated or directed from a central application server service in communication with the aggregator. Thus, method 700 may include obtaining television content (701A) and obtaining Internet media content (701B), which may be depicted in FIG. 7 as obtaining a plurality of media content at an aggregator (701). Method 700 may include formulating an overlay from the additional relevant data (3706). For example, aggregator 3610 may formulated overlay 3649 from relevant data 3648. Method 700 may include sending the overlay, which may be a partial overlay, to the device for presentation along with the aggregated content at the graphical user interface. For example, aggregator 3610 may send overlay 3649 to device 3601 for presentation along with aggregated content 3646 at a graphical user interface of device 3601.

Method 700 may include aggregating the television content and the other media content into aggregated content (702). For example, aggregator/IoT controller 610 may aggregate OTA content 641 and OTT content 642 into aggregated content 646. Method 700 may include sending the aggregated content over a network to the device for presentation at the graphical user interface (703). For example, aggregator/IoT controller 610 may send aggregated content 646 over network 630 for presentation at a graphical user interface of device 601.

Method 700 may include receiving a command through a wireless interface, the command requesting performance of an operation at an Internet of Things (IoT) device, the Internet of Things (IoT) device selected from among a plurality of Internet of Things (IoT) devices (704). For example, user 651 may enter input at device 601 to formulate command 647. Command 647 may be a request to perform an operation at (e.g., turn on or off or otherwise adjust) IoT device 602C. Device 601 may send command 647 to aggregator/IoT controller 610. Aggregator/IoT controller 610 may receive command 647 from device 601.

Method 700 may include sending instructions through the wireless interface to the Internet of Things (IoT) device to perform the operation at the Internet of Things (IoT) device while aggregated content is being sent over the network. Aggregator/IoT controller 610 may transform command 647 into instructions 648 for performing the requested operation at IoT device 602C. Aggregator/IoT controller 610 may send instructions 648 to IoT device 602C. IoT device 602C may receive instructions 648 from aggregator/IoT controller 610. IoT device 602C may implement instructions 648 to perform the function requested by user 651.

Individual components or elements of the system and method may be used interchangeably. The order of the method or processes described above may be arranged in any combination in various embodiments. In some embodiments, various steps may be omitted.

It should also be understood that the above methods may exist as other embodiments when not in operation. Specifically, a computer program may exist on a non-transitory storage medium such as a hard disk, flash drive, nonvolatile memory, or other storage device, which captures the operational processes and characteristics described above, and which may be executed by a computer or other device to perform the method described above.

The computer program may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations.

Further, a physical system may also be designed by employing existing components and hardware known to those of ordinary skill in the art, such as to effect the operation of the method described above in a general purpose computer, a specialized computer or machine, as a software on chip, or as part of other integrated circuits or combination of circuitry and components.

Another Architecture

Accordingly, aspects of the invention may leverage hardware used for media content aggregation to also control IoT devices to create a "smart" space. Aspects take advantage of a controlled intranet within a single room made possible with an aggregator, then a connection to a wider intranet that already exists within a building, and then the subsequent internet connection to appropriate cloud systems. A controlled intranet environment within a single room may be achieved through a router. The router connects tablets, smartphones, and other devices that are used to control the aggregated content delivery and also provides a local hub for various IoT devices that may be placed throughout the room to make it "smart". The IoT devices may be light switches, door locks, power blinds, temperature control, appliances, audio/video communication equipment, etc.

The design of the system may provide numerous opportunities to control the in room IoT devices using a LINK Tablet, downloadable apps on a tenant's (e.g., guest's) mobile device, and optionally through voice applications in a set top box and/or mobile devices, as they may be connected to the same Wi-Fi router as the local IoT hub. Each IoT device may be identified and located by its IP address and/or unique identifier number, they may be monitored by a central IoT hub for activity and maintenance purposes.

Figure 8:
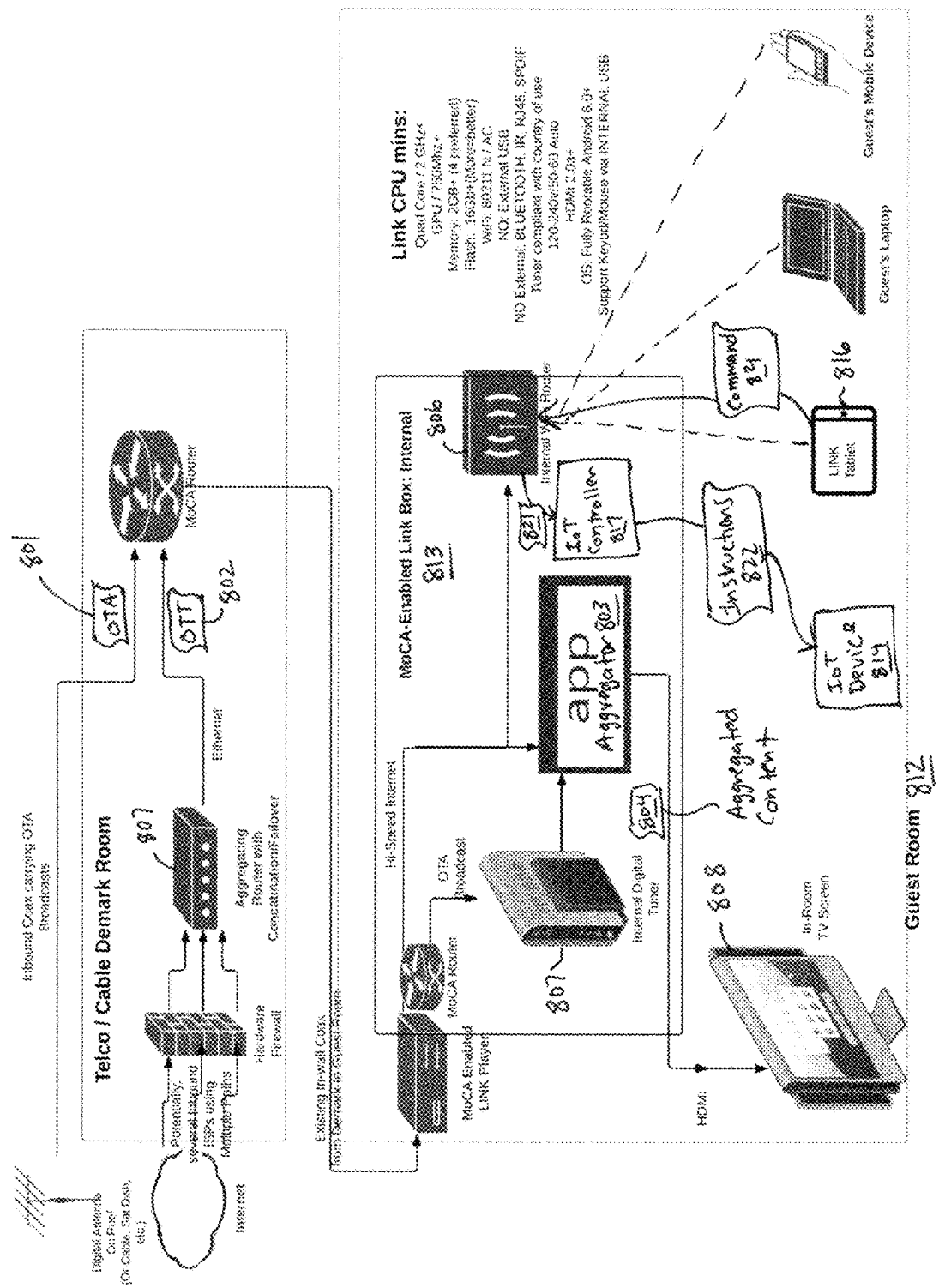
FIG. 8 illustrates an example architecture for controlling Internet of Things (IoT) devices and aggregating media content through a common device along with providing wireless connectivity.

FIG. 8 illustrates an example architecture for controlling Internet of Things (IoT) devices and aggregating media content through a common device along with providing wireless connectivity. Within demarcation room 811, OTA content 801 may be received at a digital antenna. OTT content 802 may be received via one or more inbound Internet Service Providers (ISPs) from the Internet. Router 807 may aggregate OTT content from different ISPs into OTT content 802.

OTA content 801 and OTT content 802 may be sent via coaxial cable to guest room 812 (e.g., in a hotel or dorm). At guest room 812, OTA content 801 may be routed to internal digital tuner 807. Internal digital tuner 807 may tune to a particular channel within OTA content 801. OTA content for the tuned channel may be sent to aggregator 803.

OTT content 802 may be routed to aggregator 803. Aggregator 803 may aggregate OTA content for the tuned channel and OTT content 802 into aggregated content 804. Aggregator 803 may send aggregated content 804 to in-room screen 808. In-room screen 808 may display aggregated content 804.

WiFi router 806 may provide general wireless access for the link tablet 816, laptop, or mobile device (as well as other devices) to access the Internet. A tenant of room 812 may use a link tablet 816, laptop, or mobile device to wirelessly communicate with aggregator 803 and/or IoT controller 817 through WiFi router 806. The tenant may send command to aggregator 803 to select content for aggregation, select links from a channel guide, etc. The tenant may also send a command to request performance of an operation at an IoT device (e.g., closing or opening the blinds).

For example, the tenant may send command 821 to Wi-Fi router 806. Wi-Fi router 806 may forward command 821 to IoT controller 817. IoT controller 817 may translate command 821 into instructions 822. IoT controller 817 may send instructions to IoT device 814 (through Wi-Fi router) to IoT device 814. IoT device 814 may implement the instructions 822 to perform the operation requested by the tenant.

Figure 9:
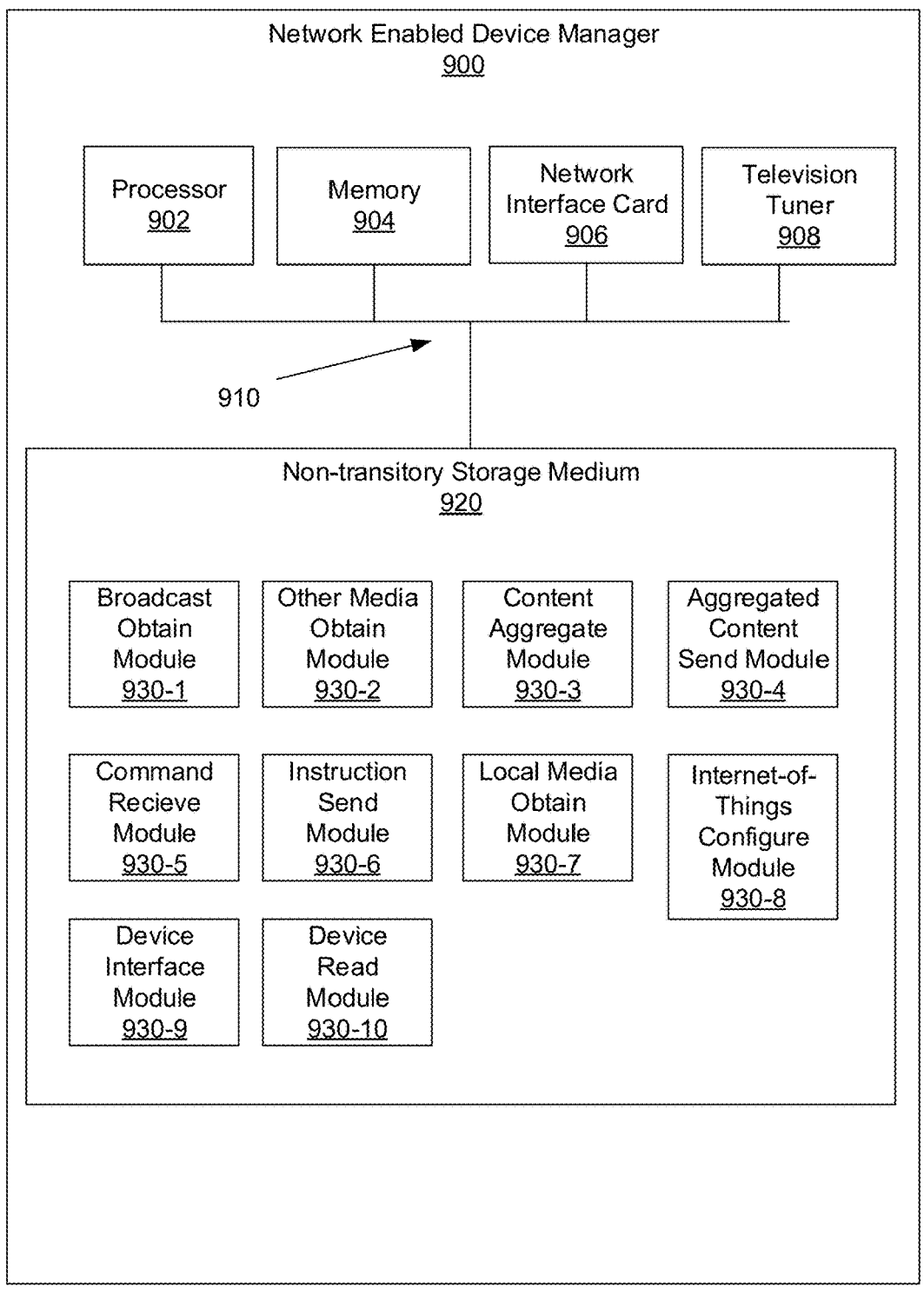
FIG. 9 illustrates an embodiment of an apparatus for managing network enabled devices.

FIG. 9 represents an apparatus for managing network enabled devices according to one example of the principles described herein. The network enabled device manager 900 may include a processor 902, memory 904, a network interface card 906, a television tuner 908, a data bus 910, and a non-transitory storage medium 920. The non-transitory storage medium 920 may include a number of modules 930. Each module may contain a combination of software and hardware. Each module 930 may cause the network enabled device manager 900 to perform a particular task. The non-transitory storage medium may include a broadcast obtain module 930-1, and other media obtain module 930-2, a content aggregate module 930-3, and aggregated content send module 930-4, a command receive module 930-5, and instructions send module 930-6, a local media obtain module 930-7, and Internet-of-Things configure module 930-8, a device interface module 930-9, and a device read module 930-10.

The broadcast obtain module 930-1 may obtain broadcast television content. The broadcast television content may be obtained using an antenna, a satellite dish, or other wireless technology. The broadcast television content may be obtained using a television tuner. The antenna, satellite dish, or television tuner may be a part of the network enabled device manager 900, or may be communicatively connected to the network enabled device manager.

The other media obtain module 930-2 may obtain other media content over a computer network. The other media obtain module 930-2 may use a network interface card 906 to communicate with a computer network regarding media content. The other media obtain module 930-2 may obtain media content from an Internet related source, such as, Hulu™ YouTube™, Netflix™, Amazon Prime™, or other Internet sources.

The content aggregate module 930-3 may aggregate the broadcast television content from the broadcast content obtain module 930-1 with the other media content obtained by the other media obtain module 930-2.

The aggregated content send module 930-4 may send the aggregated content over a network interface card 906 for presentation at a graphical user interface. The graphical user interface may be associated with a portable device associated with a user. The graphical user interface may also be displayed on a computer or television to provide a user with a view of the aggregated content.

The command receive module 930-5 may receive a command through a network interface card. The command may request performance of an operation at an Internet of Things (IoT) device. The command may originate from a portable device, computing device, or television associated with a user. The command may inform the Internet of Things device of an action to take.

The instructions send module 930-6 may send the command through the network interface card to the Internet of Things device to perform the operation at the Internet of Things device while the aggregated content is being sent over the network interface card.

The local media obtain module 930-7 may obtain local media that may be aggregated. The local media may be stored on the non-transitory storage medium. The local media may provide content for the network enabled manager 900 to aggregate as part of the content to be sent for viewing by a user.

The Internet of Things configure module 930-8 may configure devices associated with an Internet of Things to interact with the network enabled device manager 900. The Internet of Things configure module may allow for handshakes and acknowledgments to couple the Internet of Things device with the network enabled device manager 900.

The device interface module 930-9 may receive, from a device in an Internet of Things, information on interacting with the device. A first device may have a different set of interfaces than a second device. The device interface module 930-9 may allow the network enabled device manager to acquire interfaces for interacting with a number of different Internet of Things devices.

The device read module 930-10 may provide an interface for the network enabled device manager 900 to obtain the state information about a device in an Internet of Things.

Figure 10:
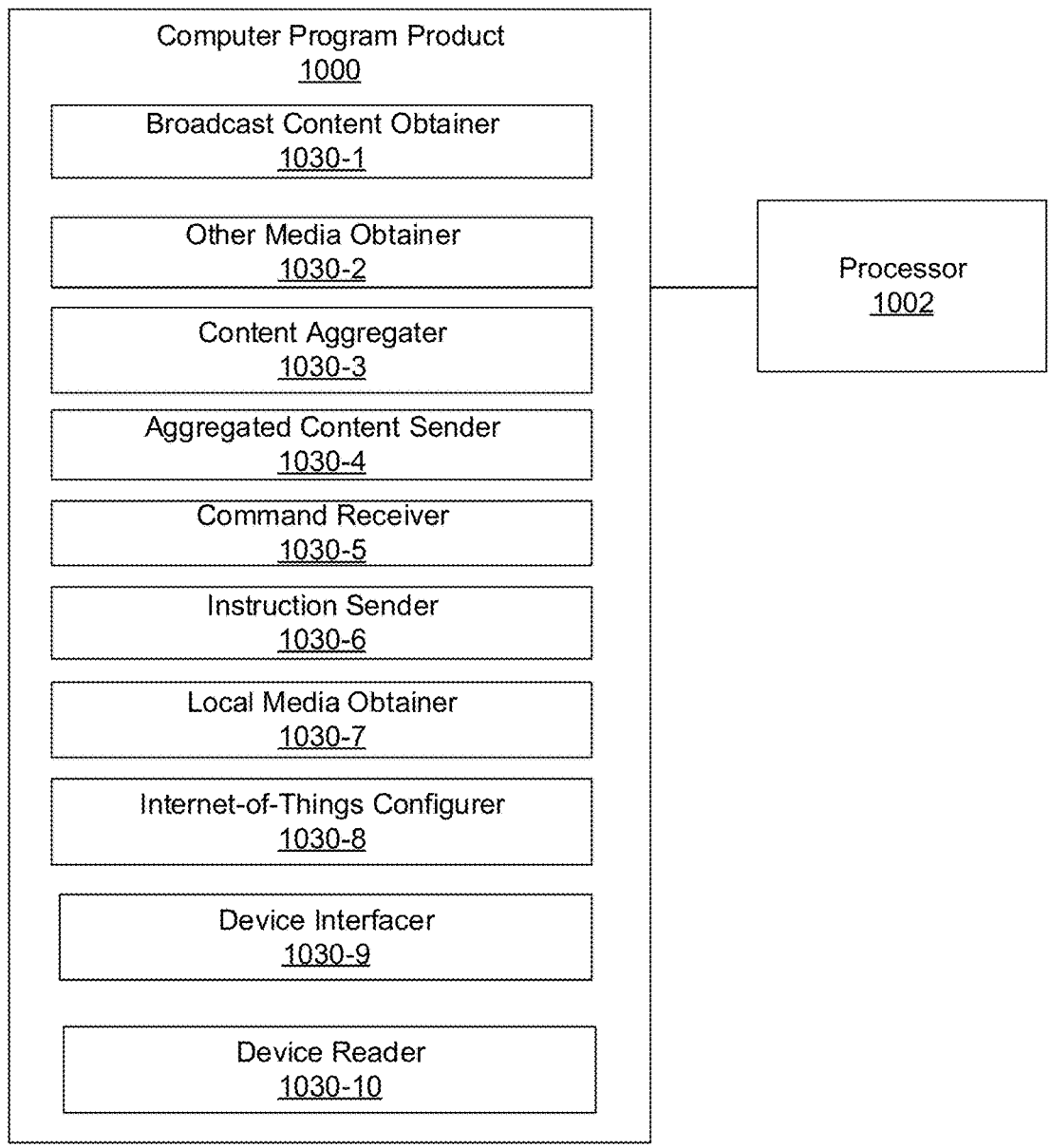
FIG. 10 represents an embodiment of a computer program product managing network enabled devices

FIG. 10 represents a computer program product 1004 managing network-enabled devices according to one example of the principles described herein. The computer program product 1000 may cause a computing device, using a processor 1002, to perform a particular task.

The computer program product 1000 may include a broadcast content obtainer 1030-1, and other media obtainer 1030-2, a content aggregator 1030-3, and aggregated content send or 1030-4, a command receiver 1030-5, and instructions sender 1030-6, a local media obtainer 1030-7, and Internet of Things configurer 1030-8, a device interface 1030-9, and a device reader 1030-10.

The broadcast content obtainer 1030-1 may obtain broadcast content, which may include wireless broadcast content received using an antenna, for display on a device associated with a user.

The other media obtainer 1030-2 may obtain other media content over a network interface card.

The content aggregator 1030-3 may aggregate a number of different media contents, including content obtained by the broadcast content obtainer 1030-1, the other media obtainer 1030-2, and the local media obtainer 1030-7.

The command receiver 1030-5 may receive a command through a network interface card. The command may request performance of an operation on an Internet of Things device. The command may request a state change of the Internet of Things device. Such command may include an operations command such as turning on a light, setting a temperature on a thermostat, or disabling a security system.

The instructions sender 1030-6 may send an instruction through a network interface card to the Internet of Things device to perform the operation at the Internet of Things device while aggregated content is being sent over the network interface card.

The local media obtainer 1030-7 may obtain local media content stored on a computing device that may be aggregated by the content aggregator 1030-3. The local media may include movies, video, advertisement stored either for a long period or temporarily on a computing device.

The Internet of Things configurer 1030-8 may configure an Internet of Things device to interact with a computing device. Such configuration may include bonding the Internet of Things device with the computing device for security reasons.

The device interfacer 1030-9 may provide a computing interface between a computing device and an Internet of Things device to allow the computing device to interact with the Internet of Things device.

The device reader 1030-20 may read a state from an Internet of Things device. The state may include information such as whether the device is in an off mode or in an on mode, a temperature reading, a desired temperature reading, and activity level, or other information about what is occurring on the Internet of Things device.

Overlaying Other Data on Aggregated Media Content

Figure 11:
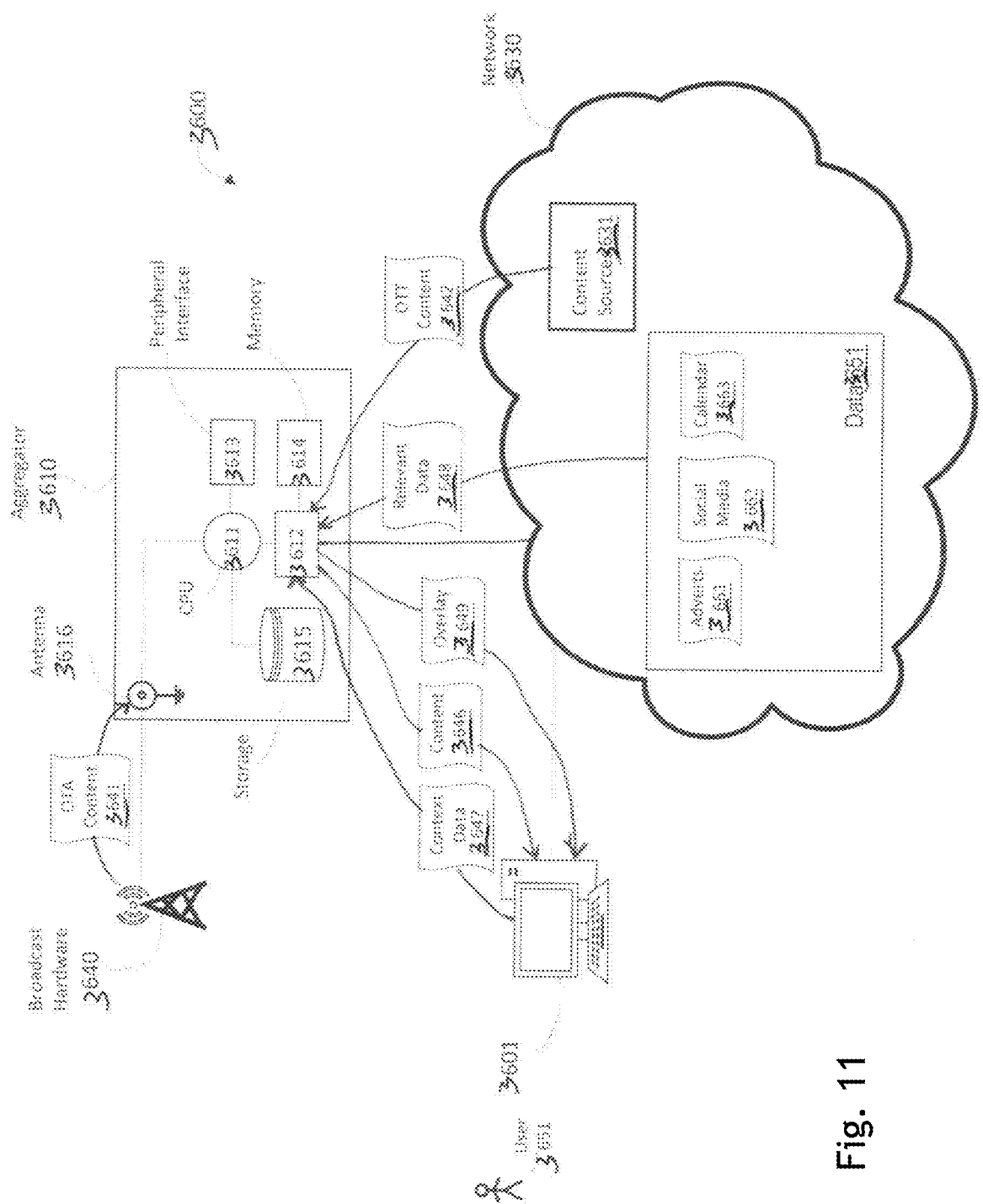
FIG. 11 illustrates an example architecture that facilitates overlaying other relevant data on aggregated media content at a graphical user interface.

FIG. 11 illustrates an example architecture 3600 that facilitates overlaying other relevant data on aggregated media content at a graphical user interface. As depicted, computer architecture 3600 includes device 3601, aggregator 3610, network 3630, and over-the-air broadcast hardware 3640. Aggregator 3610 may aggregate access to and delivery of media content from multiple sources across multiple devices for multiple users. Aggregator 3610 may also identify and present additional relevant data for overlaying aggregated media content.

As depicted, aggregator 3610 includes CPU 3611, communication interface 3612, peripheral interface 3613, memory 3614, and antenna 3616. In one aspect, aggregator 3610 is included in a router that also provides wireless network connectivity to other devices.

Device 3601 may include a mobile device, a tablet, a computer, a wearable electronic device, or any other device or combination of circuits structured and configured to communicate with another device, computer, aggregator 3610, etc. via Bluetooth or Wi-Fi connection.

Device 3601 may comprise application(s) and user interface(s) (front-end interface) that allows a user to interact with aggregator 3610, content sources 3631, and data 3651 as well as other servers, services and stored applications and programs thereon (back-end processing). The user interface may be proprietary and may comprise a custom developed mobile or desktop application(s). Alternatively, or in addition to, the user interface may comprise a web browser, mobile browser, or other application or executable code that allows for communication and visualization of information.

Over-the-air broadcast hardware 3640 may broadcast over-the-air (OTA) content 3641. Antenna 3616 may receive OTA content 3641. Alternately, antenna 3616 may be external to aggregator 3610. Antenna 3616 may receive OTA content 3641 and OTA content 3641 may be transferred to aggregator 3610 via coaxial cable. Antenna 3616 may be compatible for receiving one or more of: NTSC, ATSC, DVB-T and DVB signals.

Network 3630 may be a local area network (LAN), wide area network (WAN) or even the Internet. Network 3630 includes content sources 3631 and data 3651.

Communication interface 3612 may receive OTT content 3642 from content sources 3631. Communication interface 3612 may include a LTE chip or other equivalent cellular chip (e.g., WiMax, CDMA, EDGE, 5G, GPRS, GSM, etc.) for wireless communications and broadband access. Communication interface 3612 may also include a Wi-Fi interface, a Bluetooth interface, or wired (e.g., Ethernet) interface. OTA content 3641 or portions thereof and/or OTT content 3642 or portions thereof may be transmitted through communication interface 3612 to device 3601.

Aggregator 3610 may also include components for amplifying and/or control signals, including signals received via antenna 3616.

Aggregator 3610 may include an operating system, such as, for example, Android, iOS, Windows, Linux, etc. Aggregator 3610 may include telephony components and input/output for providing voice over IP services. Aggregator 3610 may a digital video recorder (DVR) or personal video recorder (PVR) to record various media content (e.g., stored in storage 3615). The recorder may be structured and configured to capture a plurality of streams or content simultaneously.

In one aspect, aggregator 3610 supports a plurality of antennas for separately receiving authorized content to separate residents living in close proximity.

In one aspect, aggregator 3610 aggregates content from multiple content sources into content 3646. For example, aggregator 3610 may aggregate content from a channel of OTA content 3641 and from an application of OTT content 3642. Aggregator 3610 may send aggregated content 3646 through communication interface 3612 over network 3630 to device 3601.

Data 3651 may be used to formulate overlays for overlay presented aggregated content based on a context associated with device 3601. As depicted, data 3651 includes advertisements 3661, social media data 3662, and calendar items 3663. The context may be information about user 3651 and/or device 3601, such as, for example, date, time, location, user preferences, social media connections, etc.

Figure 12:
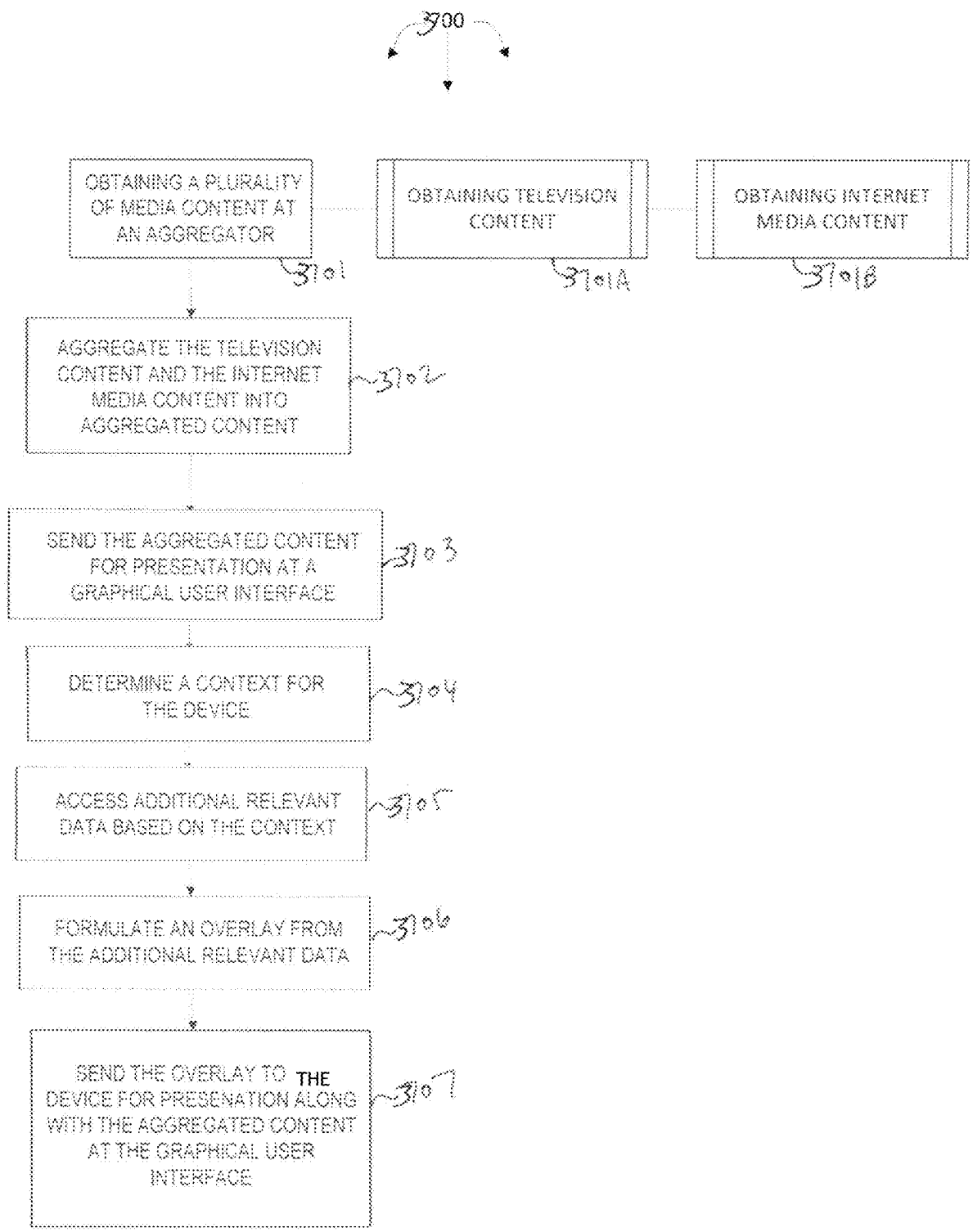
FIG. 12 illustrates a flow chart of an example method for overlaying other relevant data on aggregated media content at a graphical user interface.

FIG. 12 illustrates a flow chart of an example method 3700 for overlaying other relevant data on aggregated media content at a graphical user interface. Method 3700 will be described with respect to the components and data in computer architecture 3600.

Method 3700 includes obtaining a plurality of media content at an aggregator (3701). For example, aggregator 3610 may obtain OTA content 3641 and OTT content 3642. A plurality of content may include television content, Internet media content comprising live streams and/or pre-recorded content, gaming content, music content, media-on-demand content, other media content whether over-the-air signals, or by Internet or local networks, and/or combinations thereof. For example, television content may be obtained via a coaxial in to the aggregator deployed as a set top box or router, and Internet content may be spidered or crawled from the web, or may be updated or directed from a central application server service in communication with the aggregator. Thus, method 3700 may include obtaining television content (3701A) and obtaining Internet media content (3701B). Method 3700 includes aggregating the television content and the other media content into aggregated content (3702). For example, aggregator 3610 may aggregate OTA content 3641 ad OTT content 3642 into aggregated content 3646. Method 3700 includes sending the aggregated content over a network to the device for presentation at the graphical user interface (3703). For example, aggregator 3610 may send aggregated content 3646 over network 3630 for presentation at a graphical user interface of device 3601.

Method 3700 includes determining a context for the device (3704). For example, device 3601 may send context data 3647 to aggregator 3610. Context data 3647 may be information about user 3651 and/or device 3601, such as, for example, date, time, location, user preferences, social media connections, etc. From content data 3647, aggregator 3610 may determine a context for device 3601 and/or user 3651.

Method 3700 includes accessing additional relevant data based on the context (3705). For example, aggregator 3610 may access relevant data 3648 from data 3651, such as, for example, advertisements, social media posts, calendar items, etc. that are relevant to user 3651 and/or device 3601.

Method 3700 includes formulating an overlay from the additional relevant data (3706). For example, aggregator 3610 may formulated overlay 3649 from relevant data 3648. Method 3700 includes sending the overlay to the device for presentation along with the aggregated content at the graphical user interface. For example, aggregator 3610 may send overlay 3649 to device 3601 for presentation along with aggregated content 3646 at a graphical user interface of device 3601.

In one aspect, social media content may be displayed as an overlay, based on the particular media content that is current being played by a user or on a user device in communication with the aggregator, or by the aggregator in communication with a display. As an illustrative example, a Twitter feed for a TV show may be identified by its hashtag #tvshowname, and upon user direction or setting, new feeds having prematched criteria (i.e., only from users X Y Z or friends of the end user) may be displayed as an overlay when the end user is watching the respective TV show.

In one aspect, an advertisement may be displayed as an overlay, such as, for example, for an event that is occurring near the location of user 3651 and/or device 3601.

Advertisement content in advertisements 3651 may be collected and populated on both local servers (for hotels and landlords should they choose this is necessary) and on cloud servers (for hotels/landlords as well as local and regional retailers). A platform and software may be provided to the retailers to create ads for the television and tablet. On the client side, the content aggregation permits retrieval and delivery as per business logic.

Targeted ads may be chosen based on location, time, and personal attributes of the travelers both past (such as spending habits) and present (such as today's viewing habits) and will be shown at app switching, unused television real estate while viewing when legally permissible, and during idle times of the television and tablet.

A fulfillment engine may allow a user to connect to the retailers if necessary, make the payment, and then arrange for delivery or pickup.

Other Individual components or elements of the system and method may be used interchangeably. The order of the method or processes described above may be arranged in any combination in various embodiments. In some embodiments, various steps may be omitted.

It should also be understood that the above methods may exist as other embodiments when not in operation. Specifically, a computer program may exist on a non-transitory storage medium such as a hard disk, flash drive, nonvolatile memory, or other storage device, which captures the operational processes and characteristics described above, and which may be executed by a computer or other device to perform the method described above.

The computer program may be written in any programmable or interpretable language known to a person reasonably skilled in the art, including but not limited to C, C++, C#, Ruby, Java, Dart, Rust, Swift, PHP, Perl, HTML, XHTML, and other equivalent languages and past, present and future variations.

Further, a physical system may also be designed by employing existing components and hardware known to those of ordinary skill in the art, such as to effect the operation of the method described above in a general purpose computer, a specialized computer or machine, as a software on chip, or as part of other integrated circuits or combination of circuitry and components.

Another Architecture

Figure 13:
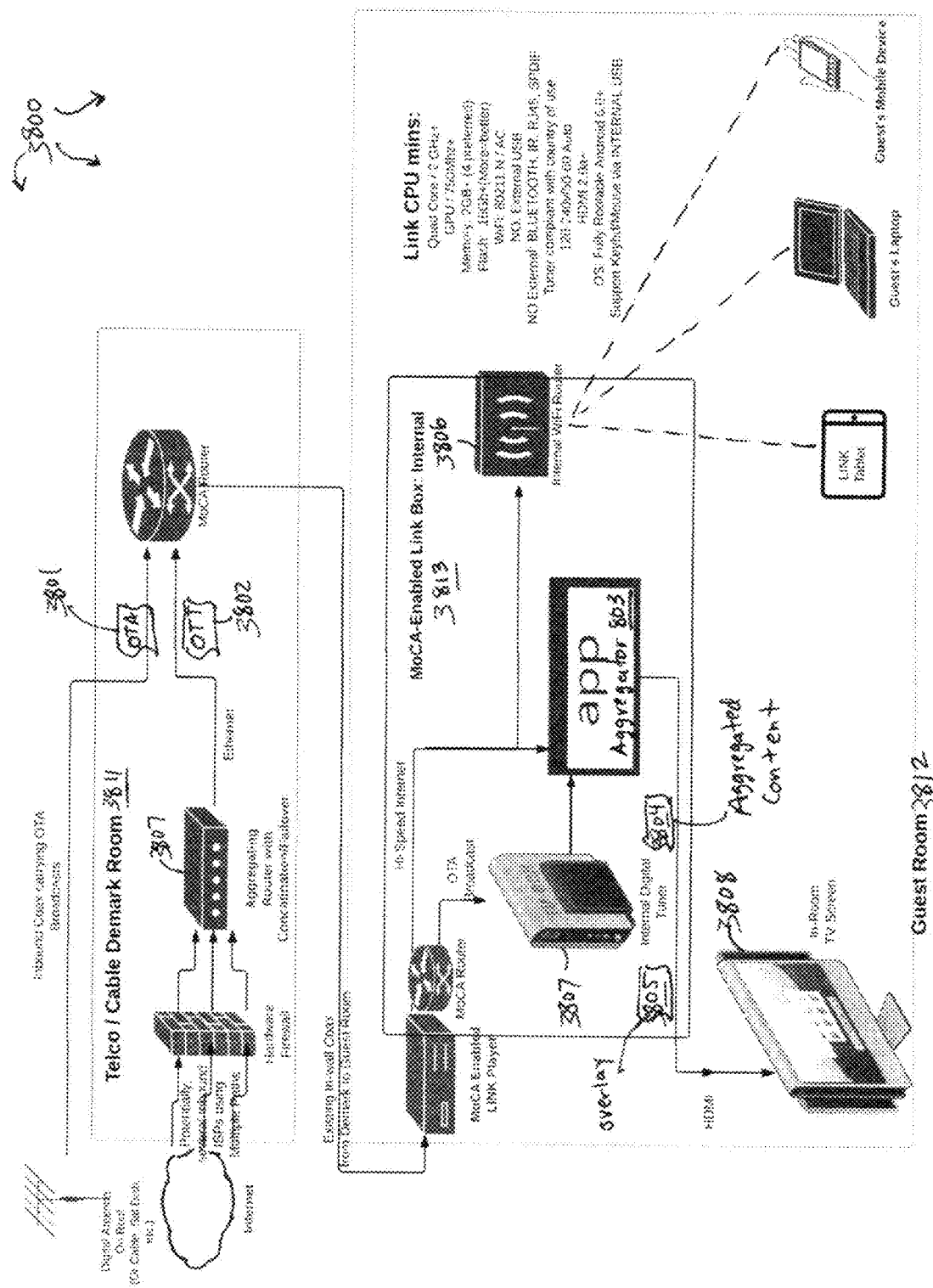
FIG. 13 illustrates an example architecture for overlaying other relevant data on aggregated media content along with providing wireless connectivity.

FIG. 13 illustrates an example architecture 3800 for overlaying other relevant data on aggregated media content along with providing wireless connectivity. Within demarcation room 3811, OTA content 3801 may be received at a digital antenna. OTT content 3802 as well as data for overlays may be received via one or more inbound Internet Service Providers (ISPs) from the Internet. Router 3807 may aggregate OTT content from different ISPs into OTT content 3802.

OTA content 3801, OTT content 3802, and data for overlays may be sent via coaxial cable to guest room 3812 (e.g., in a hotel or dorm). At guest room 3812, OTA content 3801 may be routed to internal digital tuner 3807. Internal digital tuner 3807 may tune to a particular channel within OTA content 3801. OTA content for the tuned channel may be sent to aggregator 3803.

OTT content 3802 as well as data for overlays may be routed to aggregator 3803. Aggregator 3803 may aggregate OTA content for the tuned channel and OTT content 3802 into aggregated content 3804. Aggregator 3803 may send aggregated content 3804 to in-room screen 3808. In-room screen 3808 may display aggregated content 3804.

A tenant of room 3812 may use a link tablet, laptop, or mobile device to wirelessly communicate with aggregator 3803 through WiFi router 3806. The tenant may send command to aggregator 3803 to select content for aggregation, select links from a channel guide, etc. WiFi router 3806 may also provide general wireless access for the link tablet, laptop, or mobile device (as well as other devices) to access the Internet.

Aggregator 3803 may also derive a context for the tenant of room 3812. Aggregator 3803 may use the context to select relevant data (e.g., an advertisement, social media content, a calendar item, etc.) from the Internet for an overlay. Aggregator 3803 may formulate overlay 3805 from the relevant data. Aggregator 3803 may send overlay 3805 to in-room screen 3808. In-room screen 3808 may display overlay 3805 along with aggregated content 3804.

Additional descriptions are provided in the following paragraphs.

In this description and the following claims, Media over Coax Alliance ("MoCA") is defined as the international standards consortium publishing specifications for networking over coaxial cable, including MoCA 1.1, MoCA 2.0, and MoCA 2.5.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media may be any available media that may be accessed by a general purpose or special purpose computer system. Computer-readable media that store computer-executable instructions are computer storage media (devices). Computer-readable media that carry computer-executable instructions are transmission media. Thus, by way of example, and not limitation, implementations may comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which may be used to store desired program code means in the form of computer-executable instructions or data structures and which may be accessed by a general purpose or special purpose computer.

In one aspect, one or more processors are configured to execute instructions (e.g., computer-readable instructions, computer-executable instructions, etc.) to perform any of a plurality of described operations. The one or more processors may access information from system memory and/or store information in system memory. The one or more processors may (e.g., automatically) transform information between different formats.

System memory may be coupled to the one or more processors and may store instructions (e.g., computer-readable instructions, computer-executable instructions, etc.) executed by the one or more processors. The system memory may also be configured to store any of a plurality of other types of data generated and/or transformed by the described components.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links which may be used to carry desired program code means in the form of computer-executable instructions or data structures and which may be accessed by a general purpose or special purpose computer. Combinations of the above should also be included within the scope of computer-readable media.

Further, upon reaching various computer system components, program code means in the form of computer-executable instructions or data structures may be transferred automatically from transmission media to computer storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that computer storage media (devices) may be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein may be performed in one or more of: hardware, software, firmware, digital components, or analog components. For example, one or more application specific integrated circuits (ASICs) may be programmed to carry out one or more of the systems and procedures described herein. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources (e.g., compute resources, networking resources, and storage resources). The shared pool of configurable computing resources may be provisioned via virtualization and released with low effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the following claims, a "cloud computing environment" is an environment in which cloud computing is employed.

The various components depicted in described computer architectures may be connected to (or be part of) a network, such as, for example, a system bus, a Local Area Network ("LAN"), a Wide Area Network ("WAN"), and even the Internet. Accordingly, the various components as well as any other connected computer systems and their components may create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In some aspects, a computer system comprises one or more hardware processors and system memory. The one or more hardware processors execute instructions stored in the system memory to automatically perform any of the described functionality. In other aspects, computer implemented methods can be used to perform any of the described functionality. In further aspects, a computer program product includes a non-transitory storage medium having computer-executable instructions embodied on the non-transitory storage medium such that when the computer executable instructions are executed at a processor, the computer system is caused to perform any of the described functionality.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. An apparatus for managing network enabled devices, the apparatus comprising:
 a processor;
 a number of network interface cards, communicatively connected to the processor; a non-transitory storage medium, communicatively connected to the processor, to store a number of modules, each of the number of modules causing the apparatus to perform a particular task, the number of modules comprising:
 a broadcast content obtain module, the broadcast content obtain module obtaining broadcast television content;
 an other media obtain module, the other media obtain module obtaining other media content over a network interface wherein the other media includes identifying a network interface to an Internet of Things (IoT) device to perform an operation at the Internet of Things (IoT) device while aggregated content is being sent over the network interface;
 a content aggregate module, the content aggregate module aggregating the broadcast television content and the other media content into aggregated content by obtaining broadcast content, obtaining other media content over an Internet via network communication, aggregating the television content and the other media content into aggregated content, creating a number formulated links for accessing content from different sources, sending the aggregated content over a network to the device for presentation at the graphical user interface, determining a context for the device containing at least one additional service relevant to the user based on the context, for the user for an overlay formulator for formulating a partial overlay from additional relevant services, sending the partial overlay to the device for presentation along with the aggregated content at a graphical user interface, and receiving a number of selections from a user device;

an overlay module, the overlay module presenting information to a user by overlaying the information in a transparent layer on top of other media content;

an aggregated content send module, the aggregated content send module sending the aggregated content over the network interface for presentation at a graphical user interface;

a command receive module, the command receive module receiving a command through the network interface card, the command requesting performance of an operation at an Internet of Things (IoT) device; and an instruction send module, the instruction send module sending instructions through the network interface to the Internet of Things (IoT) device to perform the operation at the Internet of Things (IoT) device while aggregated content is being sent over the network interface.

2. The apparatus of claim 1, wherein the command receive module receives a plurality of commands controlling Internet of Things devices.

3. The apparatus of claim 1, wherein the number of formulated links includes selectable options for user input data to create a formulated link.

4. The apparatus of claim 1, further comprising a local media obtain module, the local media obtain module obtaining media content stored on the apparatus wherein the command receive module receives a plurality of selected aggregated content links that include user input data to operate devices in an Internet-of-Things; and wherein the content aggregator module automatically determines a location of a user device; wherein the content aggregator module displays an advertisement as an overlay along with aggregated content for an event that is occurring near a location of the user device and a user.

5. The apparatus of claim 4, wherein the content aggregate module further comprises aggregating media content stored on the apparatus.

6. The apparatus of claim 1, wherein the command receive module receives a command from a user of the apparatus to select media content or a command for an Internet-of-Things; and wherein the content aggregator module displays on overlay along with aggregated content based on.

7. The apparatus of claim 1, further comprising an Internet-of-Things configure module, the Internet-of-Things configure module creating a connection between the apparatus and a number of items in an Internet-of-Things.

8. The apparatus of claim 1, further comprising a device interface module, the device interface module receiving from a device in an Internet-of-Things, information on interacting with the device.

9. The apparatus of claim 1, further comprising a device read module, the device read module reading a state of a device in an Internet-of-Things.

10. A non-transitory computer program product for managing network enabled devices, the non-transitory computer program product comprising:

a broadcast content obtainer, the broadcast content obtainer obtaining broadcast television content;

an other media obtainer, the other media obtainer obtaining other media content over a network interface;

a content aggregator, the content aggregator aggregating the broadcast television content and the other media content into aggregated content;

an aggregated content sender, the aggregated content sender sending the aggregated content over the network interface for presentation at a graphical user interface by obtaining broadcast content, obtaining other media content over an Internet via network communication, aggregating the television content and the other media content into aggregated content, creating formulated links for accessing content from different sources, sending the aggregated content over a network to the device for presentation at the graphical user interface, determining a context for the device containing at least one additional service relevant to the user based on the context, for the user for an overlay formulator for formulating a partial overlay from additional relevant services, sending the partial overlay to the device for presentation along with the aggregated content at the graphical user interface, and receiving a number of selections from a user device;

a command receiver, the command receiver receiving a command through the network interface, the command requesting performance of an operation at an Internet of Things (IoT) device; and an instruction sender, the instruction sender sending instructions through the network interface.

11. The non-transitory computer program product of claim 10 wherein the number of formulated links includes aggregated content for creating a formulated link; wherein the content aggregator further displays an overlay of social media content along with aggregated content based on media content that is being displayed by a user.

12. The non-transitory computer program product of claim 10 wherein the command receiver receives a plurality of selected aggregated content links, wherein the content aggregator further displays an overlay of social media content along with aggregated content based on media content that is being displayed on a user device in communication with the content aggregator.

13. The non-transitory computer program product of claim 10, wherein the command receive module receives a plurality of selected aggregated content links, and wherein the content aggregator further displays an overlay of social media content along with aggregated content based on media content that is being displayed by the content aggregator in communication with a display.

14. The non-transitory computer program product of claim 10, wherein the number of formulated links includes user input data to create a formulated link, and wherein the content aggregator automatically determines a location of a user device: wherein the content aggregator displays an advertisement as an overlay along with aggregated content for an event that is occurring near a location of the user device and a user.

15. The non-transitory computer program product of claim 14, wherein the command receive module receives a plurality of selected aggregated content links that include user input data, and wherein the content aggregator identifies a social media feed for a TV show based on a hashtag associated with the TV show, and wherein the content aggregator, upon direction from a user, only displays new feeds from social media friends of the user as an overlay along with aggregated content.

16. The non-transitory computer program product of claim 10, wherein the command receiver receives a command from a user of an apparatus running the computer program product, and wherein the content aggregator displays a targeted ad, as an overlay along with aggregated content, based on a user's spending habits and same-day media viewing habits, at app switching, unused television real estate, and during idle times of a display device.

17. The non-transitory computer program product of claim 10, further comprising an Internet-of-Things configurer, the Internet-of-Things configurer creating a connection between an apparatus running the non-transitory computer program product and a number of items in an Internet-of-Things.

18. The non-transitory computer program product of claim 10, further comprising a device reader, the device reader reading a state of a device in an Internet-of-Things.

19. The non-transitory computer program product of claim 10, a device interfacer, the device interfacer receiving from a device in an Internet-of-Things, information on interacting with the device in the Internet-of-Things.

* * * * *